(12) United States Patent
Kimura et al.

(10) Patent No.: US 9,971,210 B2
(45) Date of Patent: May 15, 2018

(54) LIQUID CRYSTAL DISPLAY DEVICE

(71) Applicant: TOPPAN PRINTING CO., LTD., Taito-ku (JP)

(72) Inventors: Yukihiro Kimura, Taito-ku (JP); Kenzo Fukuyoshi, Taito-ku (JP)

(73) Assignee: TOPPAN PRINTING CO., LTD., Taito-ku (JP)

( * ) Notice: Subject to any disclaimer, the term of this patent is extended or adjusted under 35 U.S.C. 154(b) by 0 days. days.

(21) Appl. No.: 15/152,050

(22) Filed: May 11, 2016

(65) Prior Publication Data

US 2016/0252785 A1 Sep. 1, 2016

Related U.S. Application Data

(63) Continuation of application No. PCT/JP2014/052434, filed on Feb. 3, 2014.

(30) Foreign Application Priority Data

Nov. 11, 2013 (JP) .................................. 2013-233273

(51) Int. Cl.
*G02F 1/1335* (2006.01)
*G02F 1/1333* (2006.01)
(Continued)

(52) U.S. Cl.
CPC ...... *G02F 1/134309* (2013.01); *G02F 1/1368* (2013.01); *G02F 1/13306* (2013.01);
(Continued)

(58) Field of Classification Search
CPC ....................... G02F 1/13338; G02F 1/133512
See application file for complete search history.

(56) References Cited

U.S. PATENT DOCUMENTS

2006/0126003 A1* 6/2006 Yoo .................... G02F 1/136259
349/192
2010/0149116 A1* 6/2010 Yang ..................... G06F 3/0416
345/173
(Continued)

FOREIGN PATENT DOCUMENTS

JP 2653014 B2 9/1997
JP 2010-197576 A 9/2010
(Continued)

OTHER PUBLICATIONS

International Search Report dated Apr. 8, 2014 in PCT/JP2014/052434, filed Feb. 3, 2014.
(Continued)

*Primary Examiner* — Wen-Ying P Chen
(74) *Attorney, Agent, or Firm* — Oblon, McClelland, Maier & Neustadt, L.L.P.

(57) ABSTRACT

A liquid crystal display device includes a display unit including a display substrate, an array substrate, and a liquid crystal layer. The display substrate includes a first transparent substrate, one or more light absorbing resin layers, a touch electrode layer, a transparent resin layer, and a transparent electrode layer. The light absorbing resin layer is patterned such that resin portions and an opening portion are formed. The touch electrode layer is patterned such that touch electrode portions are each extended in a first direction perpendicular to a lamination direction. The touch electrode layer and the light absorbing resin layer have a same pattern such that the touch electrode portions and the resin portions overlap with one another when viewed in the lamination direction. The transparent electrode layer is patterned such that transparent electrode portions are each extended in a second direction perpendicular to the lamination direction and the first direction.

18 Claims, 16 Drawing Sheets

(51) Int. Cl.
  *G02F 1/1343* (2006.01)
  *G06F 3/041* (2006.01)
  *G06F 3/044* (2006.01)
  *G02F 1/133* (2006.01)
  *G02F 1/1368* (2006.01)

(52) U.S. Cl.
  CPC ...... *G02F 1/13338* (2013.01); *G02F 1/13439* (2013.01); *G02F 1/133345* (2013.01); *G02F 1/133512* (2013.01); *G06F 3/044* (2013.01); *G06F 3/0412* (2013.01); *G02F 2202/16* (2013.01)

(56) References Cited

U.S. PATENT DOCUMENTS

2012/0242597 A1   9/2012  Hwang et al.
2013/0120701 A1*  5/2013  Yamazaki ........... H01L 27/1225
                                                    349/138
2013/0147730 A1*  6/2013  Chien .................. G06F 3/0412
                                                    345/173

FOREIGN PATENT DOCUMENTS

| JP | 2012-203901 A | 10/2012 |
| JP | 2013-171369 A | 9/2013 |
| JP | 2013-225195 A | 10/2013 |
| KR | 2013-0052723 A | 5/2013 |
| WO | WO 2012/073792 | 6/2012 |
| WO | WO 2013/018736 | 2/2013 |
| WO | WO 2013/089019 | 6/2013 |

OTHER PUBLICATIONS

Written Opinion dated Jan. 2, 2018 in Korean Application No. 10-2016-7010642, filed Feb. 3, 2014, 12 pages (with English language translation).

* cited by examiner

LIQUID CRYSTAL DISPLAY DEVICE

CROSS-REFERENCE TO RELATED APPLICATIONS

The present application is a continuation of International Application No. PCT/JP2014/052434, filed Feb. 3, 2014, which is based upon and claims the benefits of priority to Japanese Application No. 2013-233273, filed Nov. 11, 2013. The entire contents of these applications are incorporated herein by reference.

BACKGROUND OF THE INVENTION

Field of the Invention

The present invention relates to a liquid crystal display device having a touch sensing function integrated to a liquid crystal panel thereof, and having high aperture ratio and good visibility. Moreover, the present invention can provide a liquid crystal display device provided with a touch sensing electrode where a low-resistive copper alloy film pattern is used, which is suitable for an electrode used for a touch sensing, with good light shielding properties of transmitted light and where reflective color of the copper alloy film pattern is substantially black. In other words, the present invention relates to an in-cell type liquid crystal display device in which an electrostatic capacitive type touch sensing function is integrated with liquid crystal cells.

Discussion of the Background

In recent years, liquid crystal display devices or organic EL display devices are desired to have a high aperture ratio to achieve brighter displays and low power consumption. In these display devices, in order to improve display contrast by dividing pixels, usually, a black matrix is used in which as a black material, carbon pigment or the like is dispersed into a photosensitive resin.

(Light Shielding Properties of Black Matrix)

The black matrix is arranged surrounding pixels in order to secure display contrast. To obtain high light shielding properties, generally, the black matrix is formed so as to have a large thickness larger than 1 μm inclusive on a transparent substrate such as of glass. The black matrix is formed of a black resin where a colorant such as carbon pigment is dispersed. In particular, in a frame portion that includes four sides defining the display surface where a plurality of pixels are arranged in a matrix, i.e., a black matrix having a frame shape, high light shielding properties of optical density 5 or more, or 6 or more are desired during transmission measurement. Since light from the backlight is likely to leak from the frame portion, the frame portion is desired to have high optical density which is higher than that of the black matrix formed on the display surface.

(Thinning of Black Matrix)

In a display device used for small mobile equipment such as cellular phones, to provide a high definition display such as 200 ppi (pixel per inch) or more, or 300 ppi or more, thinning of the black matrix is desired as well as high light shielding properties. In the case where the black matrix is designed to have a high definition pattern, the width of pixels becomes narrower for example 30 μm or less. Accordingly, deterioration in planarity of color filers has become apparent due to the thickness of the black matrix. A black matrix in a high definition display device having 300 ppi or more is desired to have a thin line width of 4 μm or less.

For example, since the black matrix has high light shielding properties, it is difficult to stably produce a black matrix pattern having a thin line width of 4 μm or less with a photolithography method. For example, to improve the light shielding properties, from a view point of alignment, it is extremely hard to form the black matrix having a thin line width 4 μm or less by a two-step photolithography process, i.e., with two layers. Two steps of processes for forming the black matrix are likely to cause a change in the line width or display unevenness because of alignment displacement.

In general manufacturing processes of a color filter or the like, to form a plurality of screens on a large-sized transparent substrate, usually, an alignment margin, e.g., ±2 μm is necessary. Therefore, it has been difficult to form the black matrix with two-step photolithography process.

(Touch Sensing Function of Display Device)

As a method for performing direct input to a liquid crystal display device or an organic EL display device, the following methods can be employed. These include a method of attaching a touch panel to these display devices, or a method of providing an element corresponding to a touch sensing function, for example, on a portion touching a liquid crystal layer. The latter is referred to as an in-cell method. The in-cell method includes an electrostatic capacitive method or a method using an optical sensor. The electrostatic capacitive type is often used for an in-cell type touch sensing technique, capable of accepting input from pointers such as a finger or a pen in the display device itself. In this electrostatic capacitive type, a plurality of two pairs of electrode groups described in PTL 1 to PTL 5 are required to detect electrostatic capacitance.

PTL 1: Japanese Patent No. 2653014
PTL 2: JP-A-2010-197576
PTL 3: International Publication No. 2012/073792
PTL 4: International Publication No. 2013/089019
PTL 5: International Publication No. 2013/018736

SUMMARY OF THE INVENTION

According to one aspect of the present invention, a liquid crystal display device includes a display unit including a display substrate, an array substrate, and a liquid crystal layer formed between the display substrate and the array substrate, and a control unit that controls the display unit. The display substrate includes a first transparent substrate, at least one light absorbing resin layer which is formed on the first transparent substrate and includes a black material, a touch electrode layer formed on the light absorbing resin layer, a transparent resin layer formed on the touch electrode layer, and a transparent electrode layer formed between the transparent resin layer and the liquid crystal layer. The light absorbing resin layer is patterned such that resin portions and an opening portion are formed. The touch electrode layer is patterned such that touch electrode portions of the touch electrode layer are insulated from one another and each extended in a first direction perpendicular to a lamination direction. The touch electrode layer and the light absorbing resin layer have a same pattern such that the touch electrode portions and the resin portions overlap with one another when viewed in the lamination direction. The transparent electrode layer is patterned such that transparent electrode portions of the transparent electrode layer are insulated from one another and each extended in a second direction perpendicular to the lamination direction and the first direction.

According to another aspect of the present invention, a liquid crystal display device includes a display unit including a display substrate, an array substrate, and a liquid crystal layer formed between the display substrate and the array substrate, and a control unit that controls the display unit. The display substrate includes a first transparent substrate, a first light absorbing resin layer which is formed on the first transparent substrate and includes a black material, a touch electrode layer formed on the light absorbing resin layer, a second light absorbing resin layer which is formed on the touch electrode layer and includes a black material, a transparent resin layer formed on the touch electrode layer, and a transparent electrode layer formed between the transparent resin layer and the liquid crystal layer. The first light absorbing resin layer is patterned such that resin portions and an opening portion are formed. The touch electrode layer is patterned such that touch electrode portions of the touch electrode layer are insulated from one another and each extended in a first direction perpendicular to the lamination direction. The touch electrode layer and the first light absorbing resin layer have a same pattern such that the touch electrode portions and the resin portions overlap with one another when viewed in a lamination direction.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

With reference to the drawings, hereinafter, embodiments of the present invention will be described. In the following descriptions, the same reference symbols are applied to portions having identical or substantially identical functions and elements, and explanation thereof will be omitted or explained as needed.

In the respective embodiments, only the characteristic portions will be explained, and explanation thereof will be omitted, for example, for portions not differing from elements of an ordinary display device. Also, the respective embodiments will be explained, taking a liquid crystal display device as a major example. However, as partially disclosed in the respective embodiments as well, these embodiments can be similarly applied to other display devices such as organic EL display devices.

(First Embodiment)

Hereinafter, a first embodiment of the liquid crystal display device according to the present invention will be described with reference to FIGS. 1 to 10. It should be noted that in all of the following drawings, the thickness and the dimensional ratio are appropriately changed between elements to make drawings be seen easily.

Figure 1:
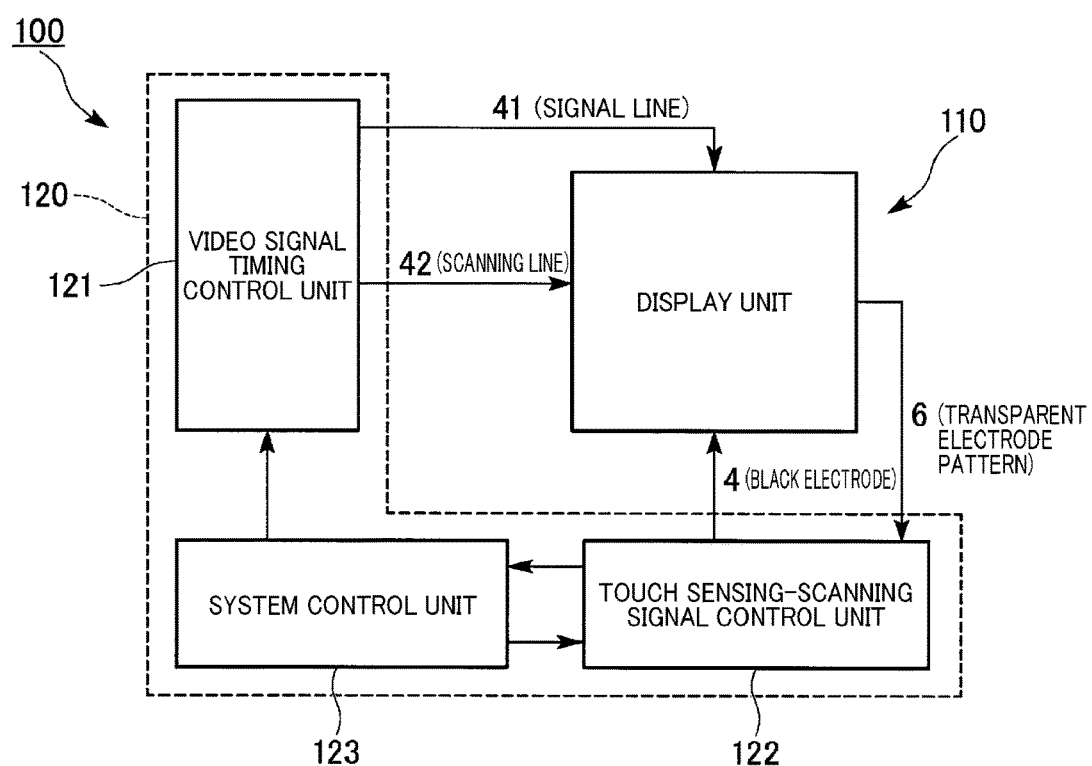
FIG. 1 is a block diagram showing a liquid crystal display device according to a first embodiment of the present invention.
Figure 2:
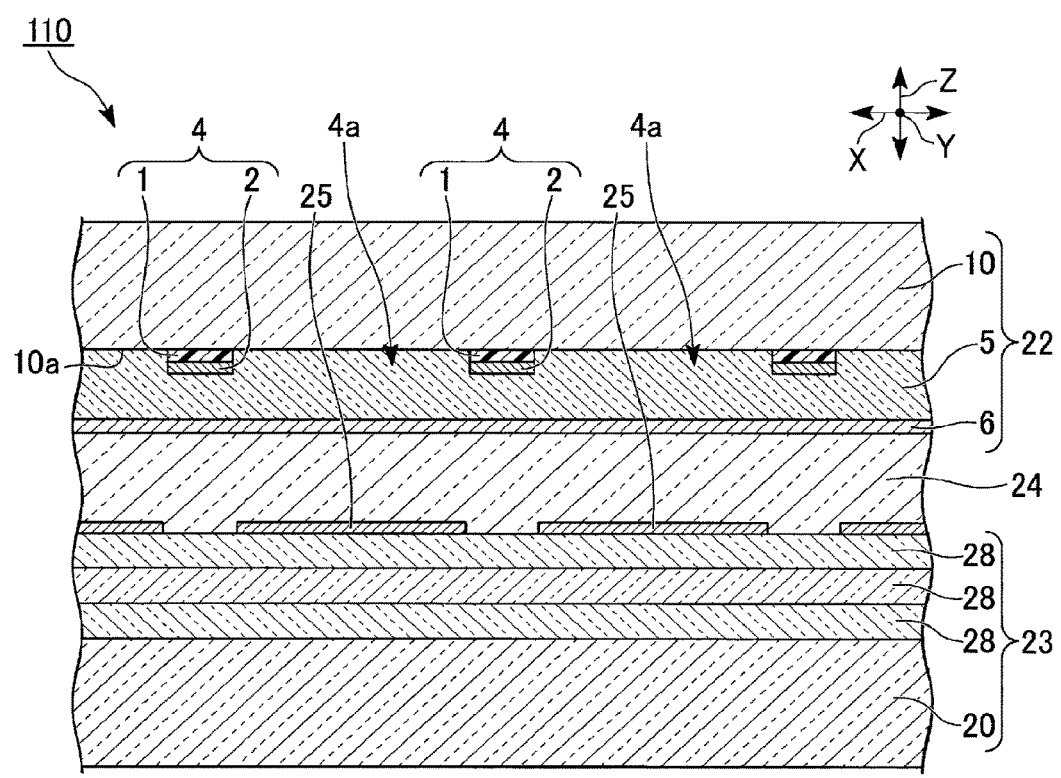
FIG. 2 is a cross sectional view showing a side surface in a display unit of the liquid crystal display device according to the first embodiment of the present invention.

As shown in FIG. 1, the liquid crystal display device 100 of the present embodiment is provided with a display unit 110 and a control unit 120 for controlling the display unit 110. As shown in FIG. 2, the display unit 110 is composed of a liquid crystal display device substrate (display substrate) 22 and an array substrate 23 laminated via a liquid crystal layer 24. In other words, the display unit 110 is configured such that a first transparent substrate 10 of the liquid crystal display device 22 which is described later and a second transparent substrate 20 of the array substrate 23 which is described later are attached facing each other via the liquid crystal display layer 24. It should be noted that 'facing each other' means that, in each of the transparent substrates 10 and 20, a surface where the touch electrode such as a copper alloy film pattern 2 or the like is formed, and a surface where a functional element which is described later, such as a pixel electrode 25 or a thin film transistor 43 are faced to each other. A direction along which the liquid crystal display device substrate 22, the liquid crystal layer 24 and the array substrate 23 are laminated is referred to as a lamination direction Z.

(Overall Configuration of Liquid Crystal Display Device)

The liquid crystal display device substrate 22 is composed of a plurality of light absorbing resin layer patterns (first light absorbing resin layer pattern) 1, a plurality of copper alloy film patterns 2, a transparent resin layer 5 and a plurality of transparent electrode patterns 6 laminated on a surface facing the liquid crystal layer 24 of the first transparent substrate 10, in the order of the plurality of light absorbing resin layer patterns, the plurality of copper alloy film patterns 2, the transparent resin layer 5 and the plurality of electrode patterns 6. As described above, the black electrode 4 is composed of the light absorbing resin layer pattern 1 and the copper alloy film patterns 2.

Figure 3:
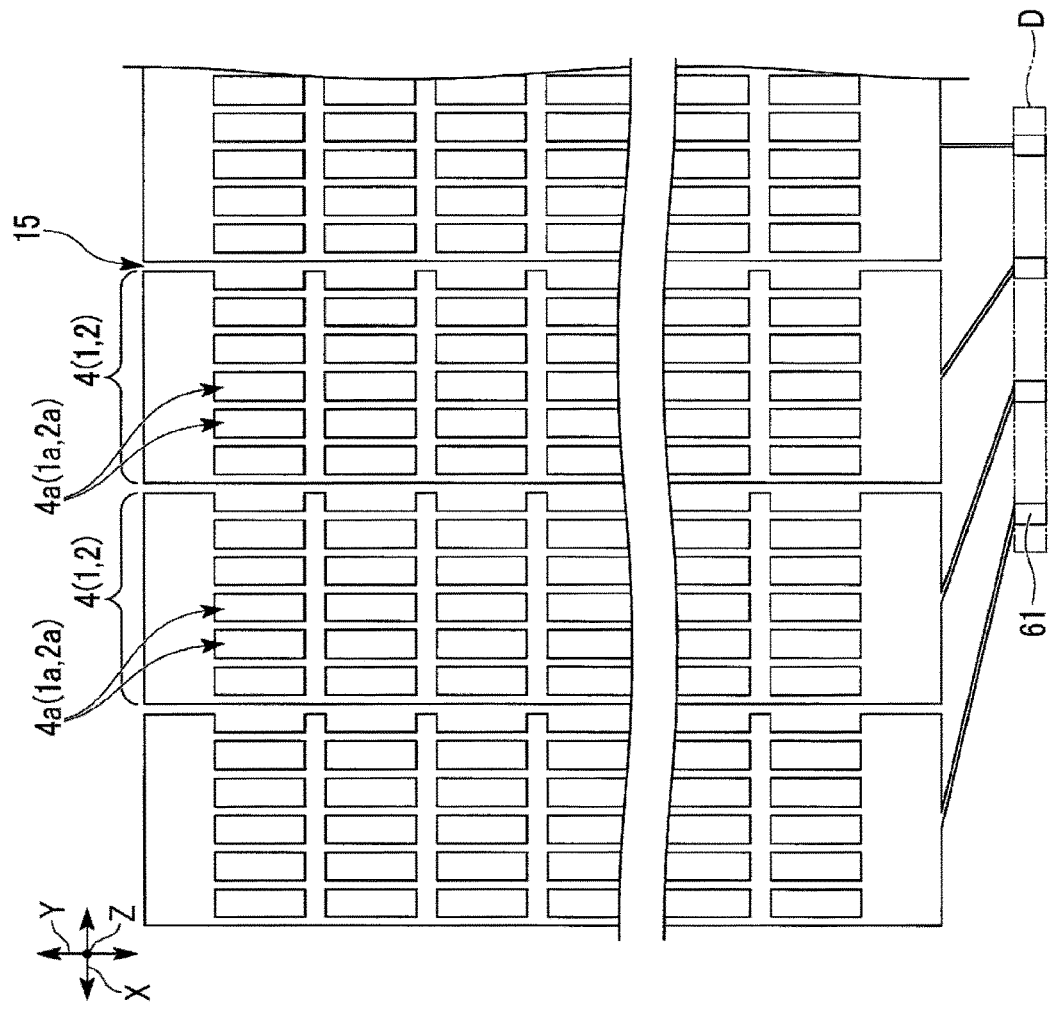
FIG. 3 is a plan view showing a black electrode of the liquid crystal display device according to the first embodiment of the present invention.

As the transparent substrate 10, for example, a glass substrate is used. As shown in FIG. 3, the plurality of light absorbing resin layer patterns 1 and the plurality of copper alloy film patterns 2 are formed in an identical pattern being overlapped with each other, when viewing parallel to the lamination direction Z (i.e., in plan view). Specifically, the plurality of light absorbing resin layer patterns 1 and the plurality of copper alloy film patterns 2 have the same dimension.

Since the shape of the light absorbing resin layer patterns 1, the shape of the light absorbing resin layer patterns 2, and the shape of the black electrodes 4 where the light absorbing resin layer patterns 1 are overlaid on the copper alloy film patterns 2 are identical, hereinafter, shapes of the copper alloy film patterns 2 will be explained as representative examples.

(Copper Alloy Layer Pattern)

In a single copper alloy film pattern 2, for example, six pixel opening portions (opening portion) 2a are arranged in the first direction X which orthogonally crosses the lamination direction Z, and for example, 480 pixel opening portions 2a are arranged in the second direction Y which orthogonally crosses both the lamination direction Z and the first direction X. The first direction X and the second direction Y are directions across a main surface 10a (see FIG. 2) of the first transparent substrate 10. The copper alloy film pattern 2 extends in the second direction Y.

The pixel opening portion 2a can be a polygonal shape having at least two parallel sides. As a polygonal shape having two parallel sides, a rectangle, a hexagon, V-shape (doglegged shape) or the like can be exemplified. As a frame shape which surrounds a periphery of these polygonal pixels, an electrically closed shape can be used. These pattern shapes influence electrical noise around the liquid crystal display device which is picked up, depending on whether it is electrically closed pattern or a partially opened (a discontinued portion is provided in the appearance) pattern in plan view. Also, a pattern shape or an area of the copper alloy film pattern 2 influences electrical noise around the liquid crystal display device which is picked up.

In the case where the copper alloy film pattern 2 is formed of a thin film copper alloy, when setting the film thickness (length in the lamination direction Z) at 100 nm or more, or 150 nm or more, the copper alloy film pattern 2 hardly transmits visible light. Hence, sufficient light shielding properties can be obtained when the film thickness of the copper alloy film pattern 2 according to the present embodiment is set to be, for example, approximately 100 nm to 200 nm. As described later, a part of the copper alloy film pattern 2 in the lamination direction Z can be formed as a metal film containing oxygen. To obtain adhesion between the glass substrate and the resin, alloy elements other than copper contained in the copper alloy film pattern 2 may preferably include one or more elements selected from magnesium, calcium, titanium, molybdenum, indium, tin, zinc, aluminum, beryllium and nickel. Specifically, copper is a good conductor having better alkali tolerance and low electrical resistance, however, adhesion properties to glass or resin are insufficient. In this respect, the adhesion properties can be improved by the alloying.

Since the resistance value of copper alloy is not significantly lowered, an amount of alloy element added to copper is preferably 3 at % or less. Setting an amount of alloy element to be 0.2 at % or more improves adhesion of thin film copper alloy. The metal forming the copper alloy film pattern 2 of the following embodiments including the present embodiment is a copper alloy containing 1 at % magnesium (the remaining part is copper) unless otherwise noted in the following descriptions. The resistance value of the copper alloy with 1 at % magnesium is not significantly changed from a case of copper itself.

Copper alloy film formation can be accomplished by a vacuum film deposition, e.g., sputtering. The alloy elements added to copper may be added to copper to produce a concentration gradient in the lamination direction Z of the copper alloy film pattern 2. The center portion of the copper alloy film pattern 2 in the lamination direction Z may be composed of 99.8 at % or more of copper. An amount of alloy element at a surface of the copper alloy film pattern 2 where the copper alloy film pattern 2 contacts the light absorbing resin layer pattern 1 in the thickness direction, or an amount of alloy element in a surface opposite to the surface of the copper alloy film pattern 2 can be set higher than the amount of alloy element in the center portion of the copper alloy film pattern 2 in the lamination direction Z, so as to produce the concentration gradient.

In a copper alloy film deposition process, oxygen can be introduced to form the copper alloy containing oxygen, when forming a portion of copper alloy having a thickness of, e.g., 2 nm to 20 nm on the surface that contacts the light absorbing resin layer pattern 1. The amount of introduced oxygen when forming the copper alloy can be 10% for example, with respect to an amount of base gas such as argon to be introduced. The alloy film in this portion having a thickness of 2 nm to 20 nm contains oxygen of e.g., 5 at % or more, whereby adherence of the copper alloy film pattern 2 which is copper alloy can be improved.

The content of oxygen at 15 at % saturates improvement of adherence. The total film thickness of the copper alloy film pattern 2 which is copper alloy, including alloy film in a portion having thickness of 2 nm to 20 nm can be set as, for example, 102 nm to 320 nm. The copper alloy film containing oxygen is formed on the surface of the copper alloy film pattern 2, whereby the reflectance of the copper alloy film pattern 2 itself can be lowered. As a result, a low reflectance effect due to the black electrode 4 can be enhanced.

As for nickel, a copper-nickel alloy containing 4 at % or more of nickel can be applied to embodiments of the present invention. For example, a copper-nickel alloy containing 4 at % or more of nickel is used to form a thin film with a thickness of 5 nm to 20 nm, intentionally containing 5 at % or more oxygen. Further, the copper-nickel alloy is laminated to have a thickness of approximately 100 nm to 300 nm, thereby producing an electrode for touch sensing, having reflectance of 30% or less.

When containing the copper-nickel alloy contain 5 at % or more oxygen, black reflected color can be obtained. The light absorbing resin layer pattern 1 is inserted on the boundary surface between the first transparent substrate 10 and the copper alloy film pattern 2 which is copper-nickel alloy, thereby obtaining reflectance of 2% or less. According to the liquid crystal display device substrate 22, when viewing from a display side surface, i.e., the first substrate 10, the black electrode 4 serves as a black matrix having low reflectance.

For example, by using two types of copper alloy film patterns 2 (black electrode 4), calculation (subtraction) of electrostatic capacitance used for a touch sensing operation is applied, thereby performing noise compensation. For example, a frame shape surrounding a rectangular shaped pixel is used, whereby electrostatic capacitance inherent to the edge of the lattice pattern (fringe capacitance, see FIG. 9) in the copper alloy film pattern 2 can be increased. Since the produced fringe capacitance is greatly reduced when touched by a pointer P such as a finger as shown in a schematic diagram of FIG. 10, an extremely large difference in the electrostatic capacitance can be obtained so that a S/N ratio can be improved. Using a structure as shown in FIG. 11 of PTL 4 in which two pairs of touch electrodes are arranged on the same plane being adjacent to each other it is difficult to obtain large fringe capacitance as obtained with the embodiments of the present invention.

Each of the copper alloy film patterns 2 is divided into six pixels in the first direction X as shown in FIG. 3, electrically insulated from each other. In other words, each of the copper alloy film patterns 2 is arranged in the first direction X, electrically insulated from each other, whereby patterning is accomplished. A gap portion 15 is formed between the copper alloy film patterns 2 which are adjacent in the first direction X.

Arranging 320 pcs of the copper alloy film patterns 2 in the first direction X, the number of pixels of the liquid crystal display device substrate becomes 1920×480. The pixel unit to be divided can be adjusted depending on the accuracy of touch sensing or a purpose of use.

The copper alloy film pattern 2 can be used as a detection electrode that detects a change in electrostatic capacitance produced in a touch sensing operation, or a scanning electrode (drive electrode) of a touch sensing. Hereinafter, a case will be described where the copper alloy film pattern 2 is mainly used as a scanning electrode.

Similar to the copper alloy film pattern 2, in the plurality of light absorbing resin layer patterns 1 and the plurality of black electrodes 4, a pixel opening portion (opening portion) 1a and a pixel opening portion 4a are formed respectively. The gap 15 is formed between the light absorbing resin layer patterns 1 which are mutually adjacent in the first direction X and between the black electrodes 4 which are mutually adjacent in the first direction X.

In the pixel opening portion 4a, the pixel opening 1a and the pixel opening 2a are overlapped.

The plurality of black electrodes 4 is arranged, as shown in FIG. 2, on the boundary surface between the first transparent substrate 10 and the transparent resin layer 5.

(Light Absorbing Resin Layer Pattern)

The light absorbing resin layer 1 is, for example, an electrical insulator. As a black material having light absorbing properties, carbon pigment can be used. The light absorbing resin pattern 1 prevents light from being reflected at a surface on the observer side and the observer visually recognizes the pattern as 'black' with their eyes.

Several organic pigments may be further added to the light absorbing resin layer pattern 1 to adjust the color. An optical density in the transmission measurement of the light absorbing resin layer pattern 1 can be, for example, less than 2. For example, the optical density by transmission measurement of the light absorbing resin layer pattern 1 is preferably in a range from 0.4 to 1.8 per 1 μm (micrometer) of unit film thickness, and the film thickness of the light absorbing resin layer pattern 1 is preferably in a range from 0.1 μm to 0.8 μm. However, the optical density or the film thickness can be set outside these numerical ranges, as needed.

The optical density of the light absorbing resin layer pattern 1 can be adjusted using an amount of a black material such as carbon pigment, or an amount of several organic pigments added to carbon pigment. As for the light absorbing resin layer pattern 1, a photosensitive black coating liquid is coated to the first transparent substrate 10, then exposed and developed to obtain the desired pattern, and cured by such as a thermal treatment, thereby forming the light absorbing resin layer pattern 1.

The photosensitive black coating liquid is produced, for example, by dispersing a carbon pigment into a mixed material of an acrylic resin and an initiator photocrosslinkable with an organic solvent, and/or a curing agent which is thermally cured. A thermosetting black coating liquid can be used, in which a curing agent which is thermally cured is only added thereto without containing an initiator of light. The black material according to the embodiments of the present invention, containing a carbon pigment as a major constituent is referred to as a black coating liquid to which carbon pigment is added with a ratio of all pigments exceeding 50 wt %.

The film thickness of the black electrode 4, that is, total film thickness of the light absorbing alloy resin layer pattern 1 and the copper alloy film pattern 2 is preferably 1 μm or less. In the case where the film thickness of the black electrode 4 is small, unevenness or projections on the surface can be smaller so as to avoid, e.g., alignment failure of the liquid crystal or the like. For example, the film thickness of the light absorbing resin layer pattern 1 can be set to 700 nm (nanometer) and the film thickness of the copper alloy film pattern 2 can be set as 180 nm. In this case, the total film thickness of the black electrode 4 is 880 nm (0.88 μm).

The transparent rein layer 5 can be formed with thermosetting acrylic resin or the like. In this example, the film thickness of the transparent resin layer 5 is set to be 1.5 μm. The film thickness of the transparent resin layer 5 can be suitably set as long as the copper alloy film pattern 2 and the transparent electrode pattern 6 are electrically insulated.

Figure 4:
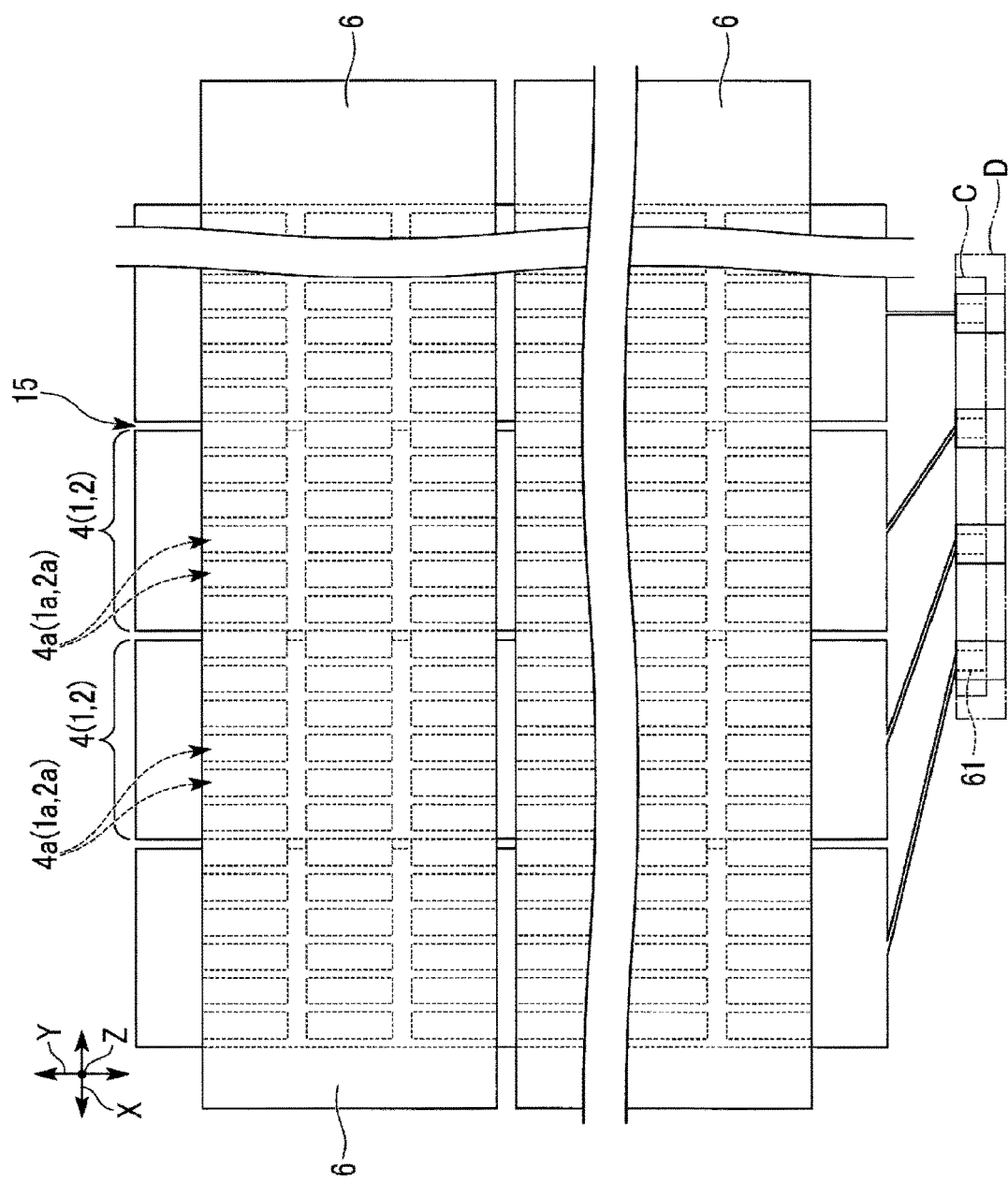
FIG. 4 is a plan view showing a black electrode pattern and a transparent electrode pattern of the liquid crystal display device according to the first embodiment of the present invention.

As shown in FIGS. 2 and 4, the plurality of transparent electrode patterns 6 are arranged on the transparent resin layer 5, for example, to be mutually insulated in the second direction Y, i.e., to be mutually electrically independent.

The transparent electrode pattern 6 is formed in a stripe shape extending in the first direction X which orthogonally crosses the copper alloy film pattern 2. The transparent electrode pattern 6 is formed of a conductive metal oxide referred to as ITO. In this example, the film thickness of the transparent electrode pattern 6 is, but not limited to 140 nm. The transparent electrode pattern 6 is the other touch electrode to be paired with the copper film electrode pattern 2.

As described later, the transparent electrode pattern 6 can be provided with a thin line of a metal film as an auxiliary conductor, extending in the longitudinal direction (length direction of stripe, first direction X) of the pattern.

The transparent electrode pattern 6 can be used as a detection electrode during a touch sensing operation.

In the embodiments of the present invention, both of the black electrode 4 and the transparent electrode pattern 6 related to touch sensing are disposed in a surface contacting the liquid crystal layer 24.

As shown in FIGS. 3 and 4, a terminal portion 61 used for mounting electrode can be provided to each of the plurality of copper alloy film patterns 2 and the plurality of transparent electrode patterns 6. These terminal portions 61 are preferably disposed in an area D of the terminal portion 61 located outside the display region having a rectangular overall shape defined by the plurality of pixel opening portions 4a.

For the copper alloy film patterns 2, not all of the patterns needs to be used as a scanning electrode of the touch signal. For example, one copper alloy film pattern 2 in every three patterns in the first direction X (scanning can be done without two copper alloy film patterns 2) can be used. In other words, the scanning can be done by thinning out some copper alloy film patterns 2. Also, the copper alloy film pattern 2 may be formed in the second direction Y and the transparent electrode pattern 6 may be formed in the first direction X. Copper alloy film patterns 2 which are not used for the scanning electrode may be electrically floated (floating pattern).

The transparent electrode pattern 6 can be at a common potential when driving the liquid crystal. High density scanning is performed by reducing the number of pattern skips of the copper alloy film pattern 2, whereby highly accurate sensing can be accomplished, thus it can be utilized for fingerprint authentication, for example.

Figure 5:
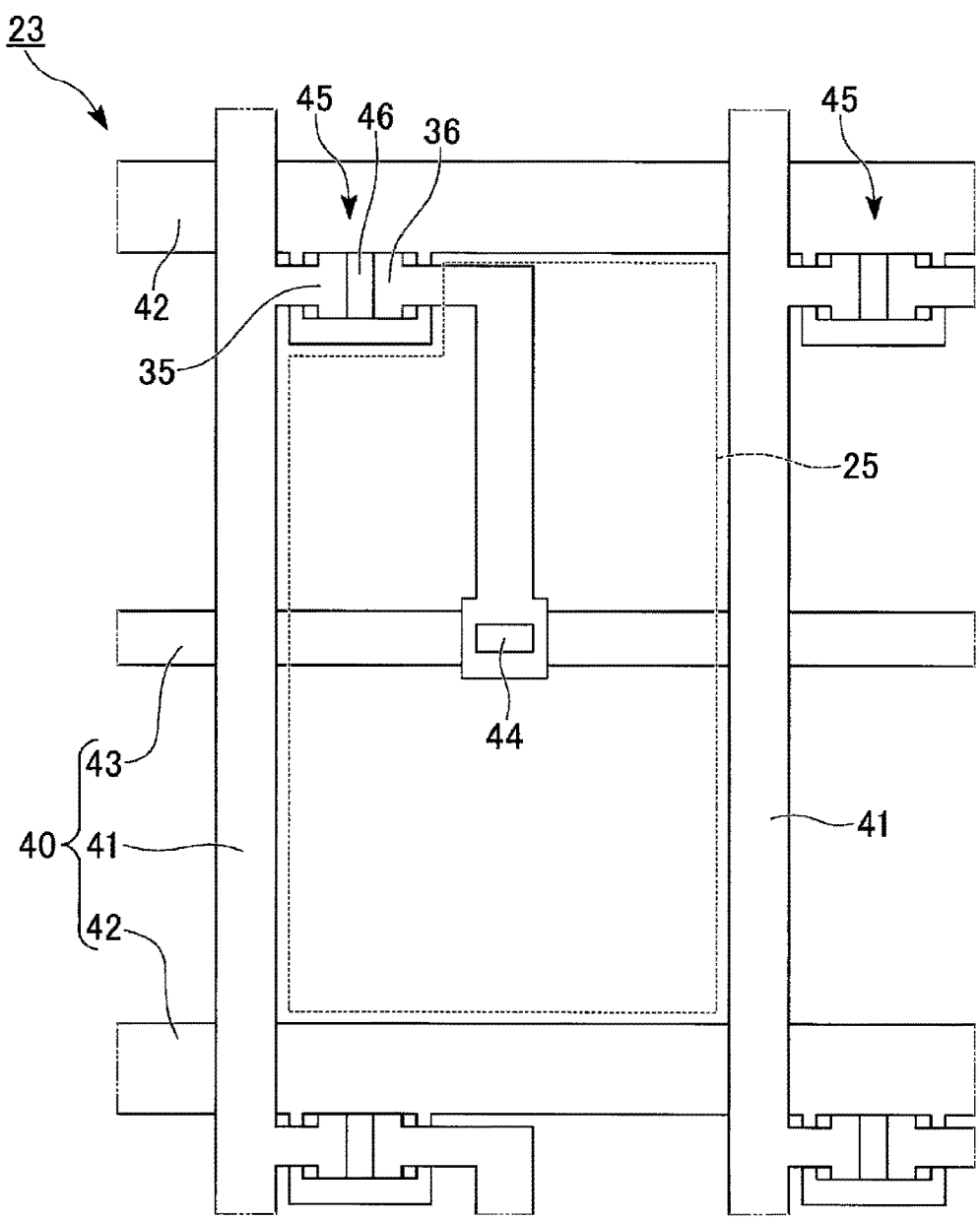
FIG. 5 is an enlarged plan view showing single pixel of an array substrate of the liquid crystal display device according to the first embodiment of the present invention.

As shown in FIGS. 2 and 5, the array substrate 23 is constituted of a metal wiring 40, a plurality of pixel electrodes 25, a plurality of thin film transistors 45 and a plurality of insulation layers 28, which are provided on a surface facing the liquid crystal layer 24 of the second transparent substrate 20. More specifically, the plurality of pixel electrodes 25 and the plurality of thin film transistors 45 are disposed on the second transparent substrate 20, via the plurality of insulation layers 28. It should be noted that the thin film transistor 45 is not shown in FIG. 2.

The second transparent substrate 20 can be formed in a manner similar to the first transparent substrate 10.

The metal wiring 40 includes a signal line (source line) 41, a scanning line (gate line) 42 and an auxiliary capacitance line 43. Each of the signal line 41, the scanning line 42 and the auxiliary capacitance line 43 has a two layer configuration containing titanium and copper.

The pixel electrodes 25 each have a publicly-known configuration, and arranged on a surface of the insulation layer 28 which faces the liquid crystal layer 24 so as to face the pixel opening portion 4a of the black electrode 4. The meal wiring 40 may be formed with a multi-layer configuration having a plurality of layers. In this case, at least one layer in the plurality of layers is a copper layer or a copper alloy metal layer, and other layers are metal layers such as of titanium or molybdenum having high melting points.

Each of the thin film transistors 45 has a channel layer 46 made of an oxide semiconductor. In the thin film transistor 45, the channel layer 46 may preferably be formed of an oxide semiconductor such as IGZO (registered trade mark) containing two or more metal oxides selected from gallium, indium, zinc, tin and germanium. Since these thin film transistors 45 have high memory effects (leak current is small), pixel capacitance after applying the liquid crystal drive voltage can be held easily. Accordingly, a configuration without the auxiliary capacitance line 43 may be used.

The thin film transistor 45 in which an oxide semiconductor such as of IGZO is used for the channel layer 46 has high electron mobility. Hence, a desired drive voltage can be applied to the pixel electrode 25 in a short period of time, for example, 2 msec (millisecond) or less. For example, even when double speed drive is used (in the case where number of display frames per second is 120 frames), one frame corresponds to approximately 8.3 msec. Therefore, for example, a period longer than 6 msec can be assigned to the touch sensing operation.

The thin film transistor 45 using an oxide semiconductor for the channel layer 46 has a small leak current as described above, and therefore the drive voltage applied to the pixel electrode 25 can be held for a long period of time. A signal line and a scanning line, an auxiliary line or the like of an active element are formed by a copper line having a wiring resistance lower than that of aluminum wiring, and further IGZO capable of driving for a short period of time is used as an active element. As a result, a time margin in touch sensing scanning is extended so that a change in produced electrostatic capacitance can be accurately detected. The oxide semiconductor such as of IGZO is adapted for an active element, whereby a drive period of the liquid crystal can be shortened. Hence, sufficient margin time for touch sensing operation can be ensured in the video signal processing of the entire display.

The drain electrode 36 is extended from the thin film transistor 45 to the center of the pixel and electrically connected to the pixel electrode 25 which is a transparent electrode, via a contract hole 44. The source electrode 35 is extended from the thin film transistor 45 so as to be electrically connected to the signal line 41.

The liquid crystal drive method of the liquid crystal molecules (illustration of the alignment film and liquid crystal molecules are omitted) possessed by the liquid crystal layer 24 is, a so called VA method (Vertically Alignment method: longitudinal electric field method using vertically aligned liquid crystal molecules) in which the initial alignment is defined as a vertical alignment, vertical to the surfaces of the liquid crystal display substrate 22 and the array substrate 33, i.e., Z-direction alignment in the lamination direction.

According to the present embodiment, liquid crystal molecules have negative dielectric anisotropy. The polarizing plate which is not shown is designed as a crossed Nicol configuration which is normally black. For the liquid crystal molecules, when voltage is applied between the transparent electrode pattern 6 and the pixel electrode 25 in the lamination direction Z, the liquid crystal molecules aligned in the lamination direction Z as an initial alignment become inclined in a direction crossing the lamination direction Z, thereby performing ON display (white display).

The liquid crystal molecules may have positive dielectric anisotropy. Photo-alignment can be used for an alignment process of the alignment film.

(Auxiliary Conductor)

The auxiliary conductor can be formed on the plurality of transparent electrode pattern 6 in order to lower the resistance thereof. The auxiliary conductor may be formed by the same material as the copper alloy film pattern 2, or may be formed of a thin film of aluminum alloy. The aluminum alloy can be an alloy where an alloying element with a range from 0.2 at % to 3 at % is added to aluminum. For the alloying elements, at least one selected from magnesium, calcium, titanium, indium, tin, zinc, neodymium, nickel and copper can be used. The resistivity of the auxiliary conductor is lower than that of the transparent electrode pattern 6.

Figure 6:
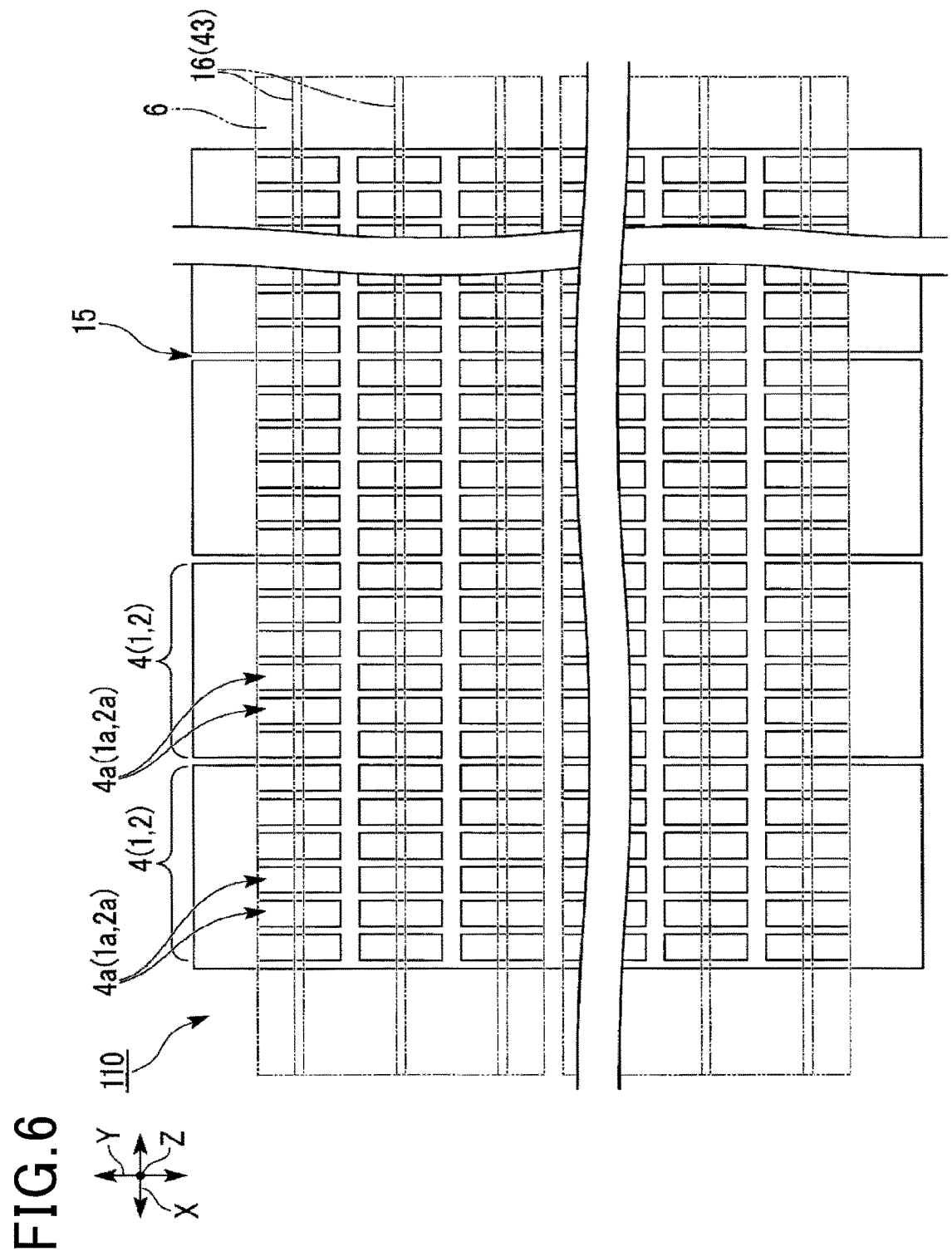
FIG. 6 is a plan view showing a positional relationship in a major portion of the liquid crystal display device according to the first embodiment of the present invention.

In plan view as shown in FIG. 6, the auxiliary conductor 16 may be formed into a linear (stripe) pattern extending in the first direction X and passing through a middle portion of the pixel opening 4a in the second direction Y. In this case, for example, when viewing in the lamination direction Z, the auxiliary conductor 16 is preferably formed at a position overlapping the auxiliary capacitance line 43 of the array substrate 23 of the auxiliary conductor 16. According to this configuration, an aperture ratio can be prevented from lowering.

Figure 7:
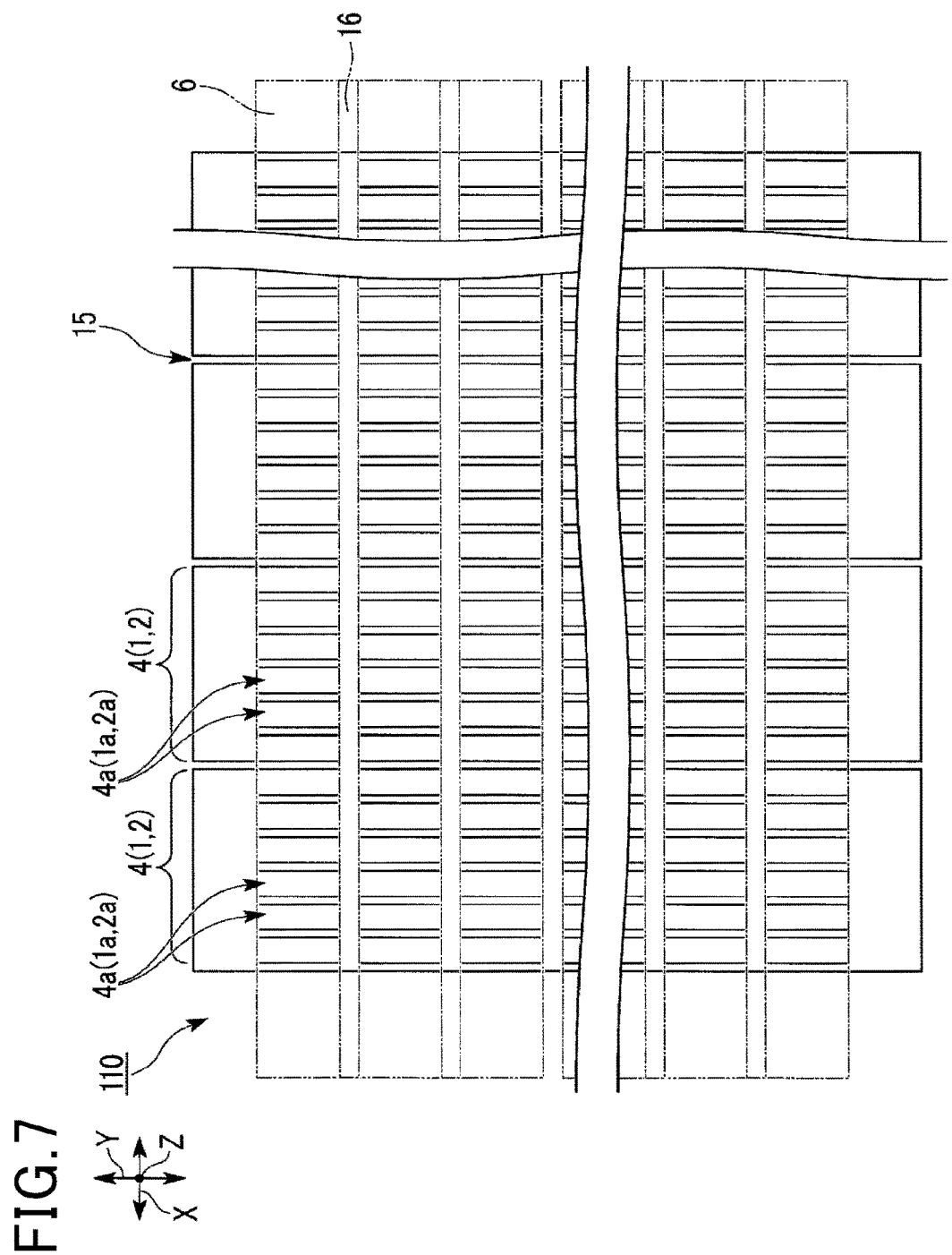
FIG. 7 is a plan view showing a positional relationship in a major portion of the liquid crystal display device according to the first embodiment of the present invention.

Alternatively, in plan view as shown in FIG. 7, the auxiliary conductor 16 may be formed in a pattern position of a touch electrode with the light absorbing resin layer pattern 1 and the copper film pattern 2, i.e., a position of the black matrix. In the lower part of the black matrix (second transparent substrate 20), usually, the metal wiring 40 including the signal line (source line) 41, the scanning line (gate line) 42 and an auxiliary line 43 of the array substrate 23 is arranged. Therefore, the auxiliary conductor 16 is formed at a position where the metal wiring 40 is arranged so that the auxiliary conductor 16 overlaps the metal wiring 40 when viewing in the lamination direction Z, thereby preventing the aperture ratio from lowering.

According to the present embodiment, the transparent electrode pattern 6 is used as, for example, a detection electrode during a touch sensing operation and is used as a common electrode to which liquid crystal drive voltage is applied between the pixel electrode 25 and the common electrode when driving the liquid crystal. The touch sensing and the liquid crystal drive are performed with a different timing in a time sharing manner.

As shown in FIG. 1, the control unit 120 has a publicly known configuration and is provided with a video signal timing control unit 121, a touch sensing-scanning signal control unit 122 and a system control unit 123. The video signal timing control unit 121 transmits a signal to the signal line 41 and the scanning line 42 of the array substrate 23 so as to apply voltage between the transparent electrode pattern 6 and the pixel electrode 25 in the lamination direction Z, thereby driving liquid crystal molecules possessed in the liquid crystal layer 24. Thus, image is displayed on the array substrate 23.

The touch sensing-scanning signal control unit 122 transmits a signal to the black electrode 4 which is a scanning electrode 4, and detects a signal transmitted from the transparent electrode pattern 6. Thus, a change in electrostatic capacitance between the copper alloy film pattern 2 and the transparent electrode pattern 6 is detected. The system control unit 123 controls the video signal timing control unit 121 and the touch sensing-scanning signal control unit 122, thereby driving the liquid crystal and detecting a change in electrostatic capacitance alternately, i.e., in a time sharing manner.

(Manufacturing Method-1 for Liquid Crystal Display Device Substrate)

Figure 8:
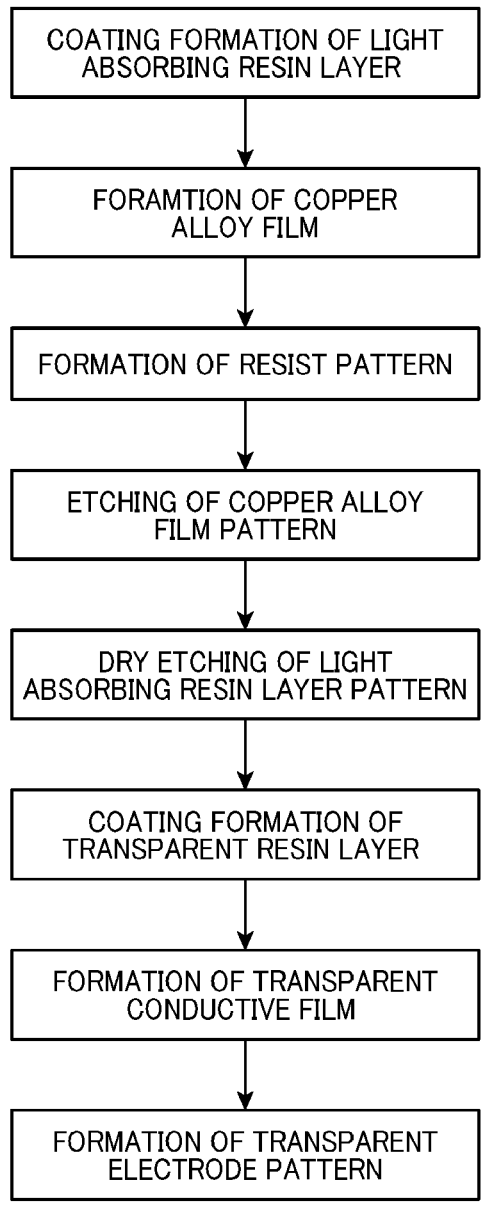
FIG. 8 is a flow chart showing a manufacturing method of a liquid crystal display substrate of the liquid crystal display device according to the first embodiment of the present invention.

Next, a manufacturing method for a liquid crystal display substrate in the display unit 110 configured as described above will be described. FIG. 8 is a flow chart showing a manufacturing method of the liquid crystal display substrate 22.

In coating and formation of a light absorbing resin layer, thermosetting black coating liquid was used. The film thickness of the light absorbing rein layer after heat treatment at 250° C. is 0.7 μm. This light absorbing resin layer is a resin layer formed before patterning is completed for the above-described light absorbing resin layer pattern 1. The film thickness of the light absorbing resin layer may be formed to be larger than 0.7 μm. By adjusting the film thickness of the light absorbing resin layer and a density of the black material which is carbon pigment, light reflection produced on the boundary surface between the first transparent substrate 10 and the light absorbing resin layer pattern 1 can be adjusted. In other words, adjusting the film thickness of the light absorbing resin layer pattern 1 and the density of the black material, light reflection produced on the boundary surface can be set to as low as 2% or less.

After forming the light absorbing resin layer, copper alloy film containing 1 at % of magnesium was formed by a sputtering apparatus. The copper alloy film was formed before a shape of the above-described copper alloy film 2 was patterned. In the initial stage of film forming process of the copper alloy film, a first copper alloy film containing oxygen was formed to have thickness of 0.01 μm, under a gas condition where 10 vol % of oxygen gas was added to argon introduced based gas. Subsequently, with only the argon introduced based gas, a second copper alloy film was formed to have thickness of 0.17 μm, thereby producing the copper alloy film having total film thickness of 0.18 μm. Next, an alkali soluble photosensitive resin was used to form a resist pattern having a matrix-shaped copper alloy film pattern 2 having a line width of 3.5 μm as shown in FIG. 3. Wet etching was performed to form the copper alloy film pattern 2 in which the pixel opening 2a is formed on the copper alloy film. The photosensitive resin will be removed with a dry etching in the next manufacturing process.

Etching of the copper alloy film pattern 2 can be performed by a wet etching method or a dry etching method. According to the wet etching method, for example, an alkali etchant having oxidizability can be used. In the case of using a dry etching method, dry etching using a halogen gas such as chlorine gas, or dry etching alternately using oxygen gas and an organic acid vapor can be used.

By using the copper alloy pattern 2 which was formed by wet etching, and introducing a gas containing oxygen in argon introduced based gas so as to perform anisotropic dry etching. As a result, the light absorbing resin layer pattern 1 and the copper alloy film pattern 2 were formed being overlapped with each other and have the same shape when viewing in plan view. The light absorbing resin layer pattern 1 and the copper alloy film pattern 2 had the same dimensions. In the anisotropic etching, the above-described photosensitive resist pattern was removed.

After forming the copper alloy film pattern 2, an alkali soluble photosensitive acrylic resin was coated on the copper alloy film pattern 2 to form a transparent resin layer 5 having a thickness of 1.6 μm. The transparent resin layer 5 was formed only on the display region such that the periphery of the display region was removed by developing, exposing a region of the terminal portion 61 which was formed of the copper alloy pattern 2.

After forming the transparent resin layer 5, by using a sputtering apparatus, a transparent conductive film which is referred to as ITO was formed on the transparent resin layer 5. By using a well-known photolithography method, the transparent electrode pattern 6 was formed from the transparent conductive film. The transparent electrode pattern 6 and the copper alloy film pattern 2 were electrically insulated from each other, each having a plurality of patterns arranged so as to be orthogonally crossed with each other via the transparent resin layer 5.

According to the above-described procedures, the liquid crystal display device substrate 22 was manufactured.

(Effects of Touch Electrode)

Hereinafter, effects obtained specially from the touch electrode of the display unit 110 configured as described above will be described.

According to the display unit 110, the transparent electrode pattern 6 can be used as a detection electrode for touch sensing operation, and the black electrode 4 can be used as a scanning electrode to which a voltage is applied with a constant frequency.

Figure 9:
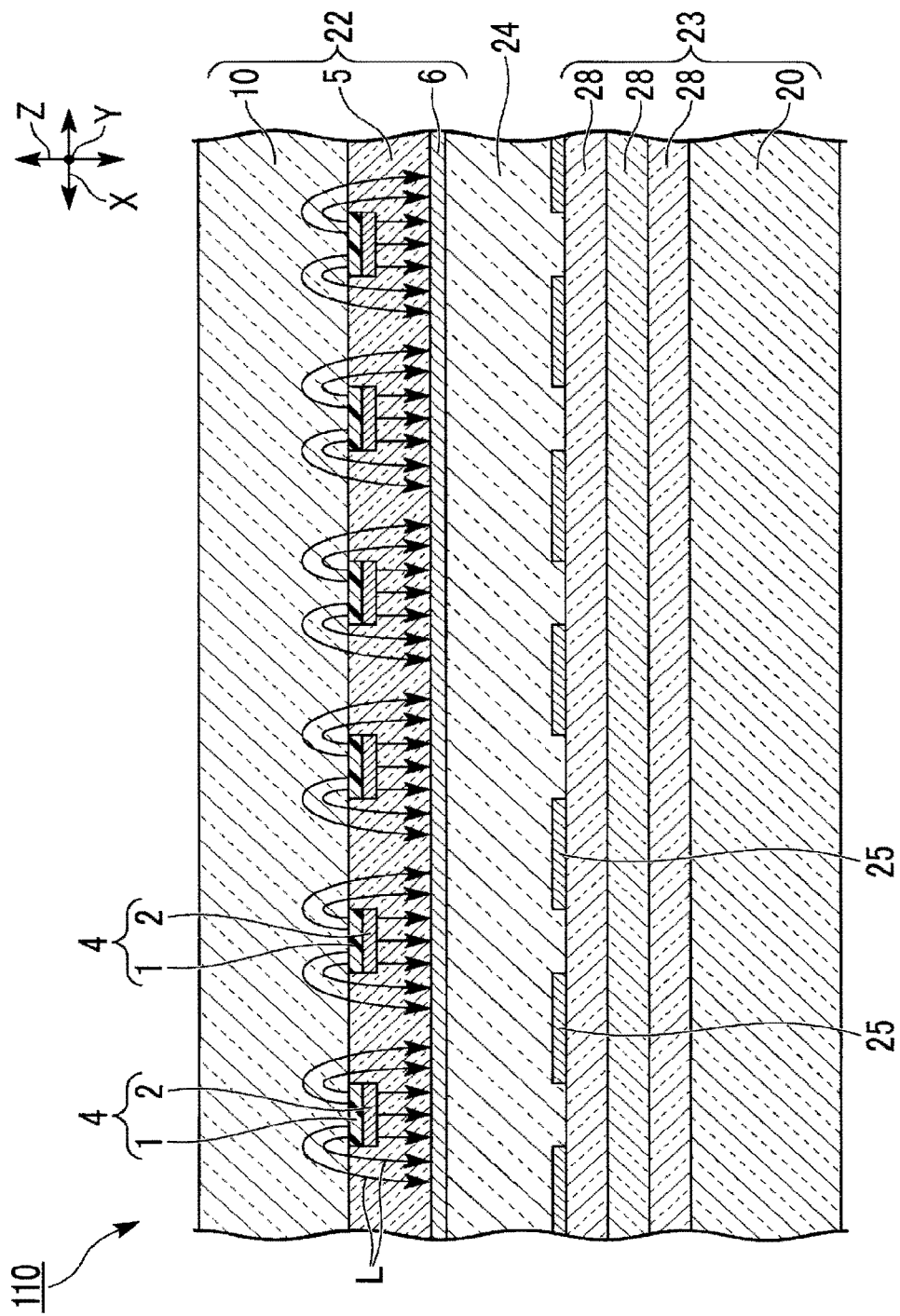
FIG. 9 is a cross sectional view explaining effects of a touch electrode of the liquid crystal display device according to the first embodiment of the present invention.

Specifically, as shown in FIG. 9, electrostatic capacitance for touch sensing operation is held between the black electrode 4 and the transparent electrode pattern 6. In the normal state, a constant voltage with a constant frequency is applied between the black electrode 4 and the transparent electrode pattern 6 to form electric lines of force L in the vicinity of the black electrode 4.

Figure 10:
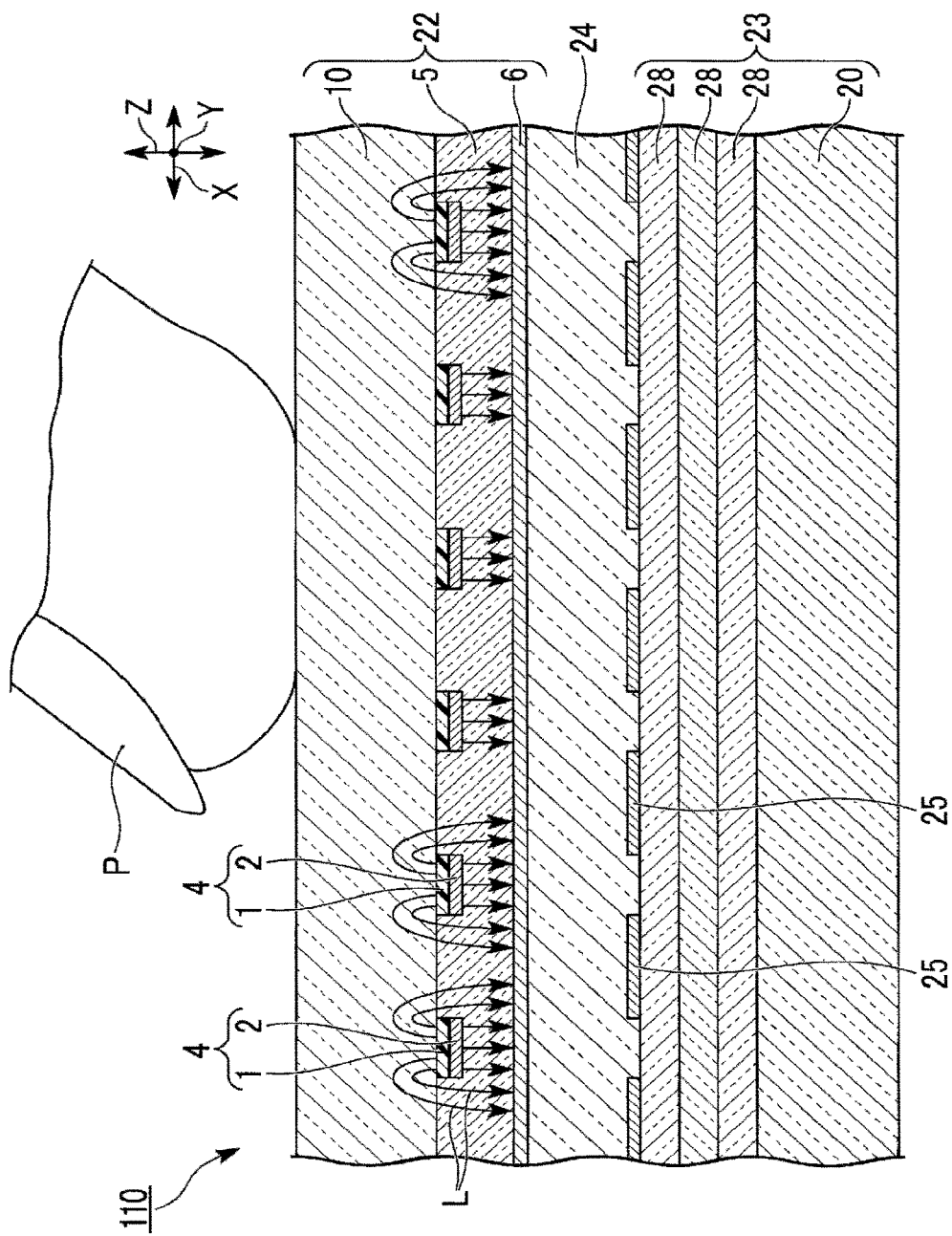
FIG. 10 is a cross sectional view explaining effects of a touch electrode of the liquid crystal display device according to the first embodiment of the present invention.
Figure 11:
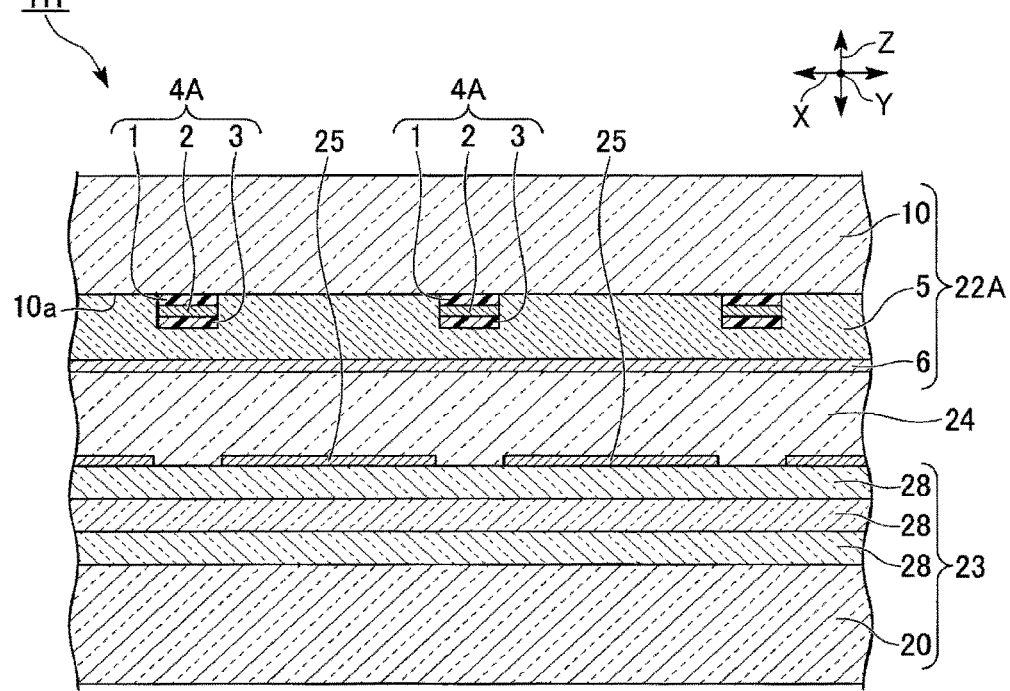
FIG. 11 is a cross sectional view showing a side surface in a display unit of the liquid crystal display device according to a second embodiment of the present invention.

As shown in FIG. 10, for example, when a pointer P such as finger approaches or touches the display screen of the black electrode 4, the distribution of the electric lines of force L is broken and electrostatic capacitance is soaked into the pointer P so that the electrostatic capacitance between the black electrode 4 and the transparent electrode pattern 5 is reduced. Whether or not the pointer P has touched the display screen is detected by detecting such a change in the electrostatic capacitance. Generally, since the intervals between adjacent black electrodes 4 are small, the pointer P simultaneously affects a plurality of touch sensing electrodes.

The black electrode 4 according to the present embodiment includes the copper alloy film pattern 2 formed of a copper alloy having a low resistance, which can be used as a scanning electrode. As for the transparent electrode pattern 6 according to the present embodiment, the pattern width can be widened in order to have low resistance, and also the transparent electrode pattern 6 according to the present embodiment can be provided with the above-described auxiliary conductor 16 in order to lower the resistance. Therefore, the time constant of two pairs of the plurality of electrode groups in the electrostatic capacitance method can be significantly reduced, whereby the detection accuracy in a touch sensing operation can be significantly improved.

As described so far, according to the liquid crystal display device 100, the plurality of light absorbing resin layer patterns 1 and the plurality of copper alloy film patterns 2 are formed in the same shape being overlapped with each other, when viewing in the lamination direction Z. Hence, the area in the pixel opening portion 1a and the pixel opening portion 2a which penetrates in the lamination direction Z can be made large to improve the aperture ratio.

In the peripheries of pixels, the light absorbing resin layer pattern 1 is provided. Accordingly, the periphery regions of the pixels are recognized as black to improve the display contrast, leading to enhancement of the visibility. Since the pixel electrode 25 is not provided between the adjacent black electrodes 4 of the liquid crystal display device substrate, the electrostatic capacitance of the touch electrode is increased, whereby position detection of the pointer P can be enhanced. Since the transparent electrode pattern 6 is shared by the black electrode 4 and the pixel electrode 25, the number of electrodes included in the display unit 110 is reduced so that the configuration of the display unit 110 can be simplified.

According to the present embodiment, the black electrode 4, i.e., the copper alloy film pattern 2 extends in the second direction Y, and the transparent electrode pattern 6 extends in the first direction X. However, the black electrode 4 may be extended in the first direction X and the transparent electrode pattern 6 may be extended in the second direction Y.

(Second Embodiment)

Figure 12:
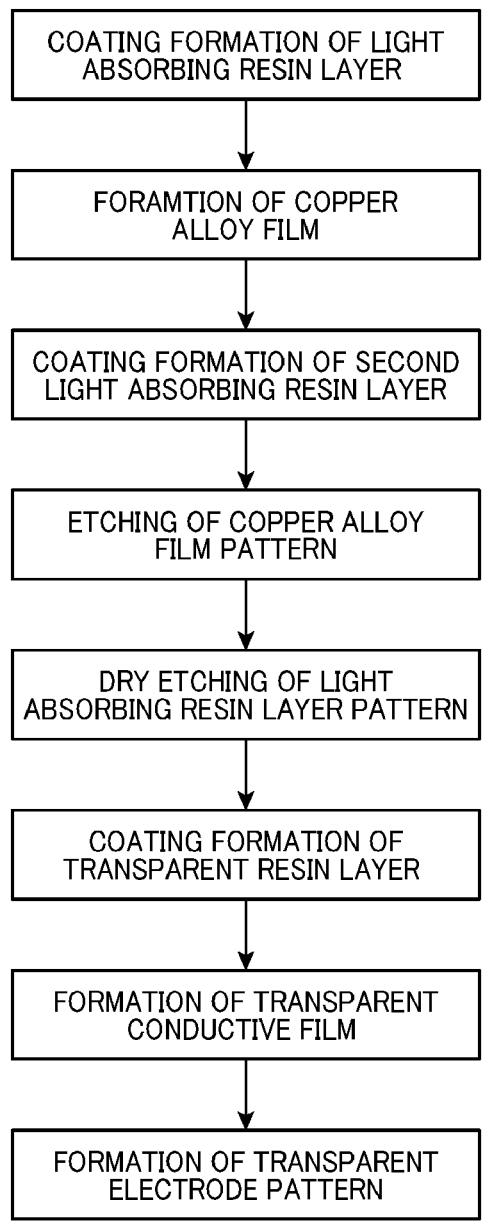
FIG. 12 is a flow chart showing a manufacturing method of a liquid crystal display substrate of the display unit according to the second embodiment of the present invention.

Next, with reference to FIGS. 11 to 12, the second embodiment of the present invention will be described. For portions identical to those in the above-described embodiment, the same reference symbols are applied and the explanation thereof is omitted, and only different portions will be described.

As shown in FIG. 11, the display unit 111 according to the present embodiment is provided with a black electrode 4A instead of the black electrode 4 of the display unit 110 in the first embodiment.

The black electrode 4A is provided with a second light absorbing resin layer pattern 3 disposed on each copper alloy film pattern 2 on an opposite side of the light absorbing resin layer pattern 1 in the copper alloy film patterns 2 residing in each of the black electrodes 4 constituted of the plurality of light absorbing resin layer patterns 1 and the plurality of copper alloy film patterns 2. In other words, the black electrode 4A has a three layer configuration.

A plurality of second light absorbing resin layer patterns 3 are formed into substantially the same shape as that of the plurality of light absorbing resin layer patterns 1 and the plurality of copper alloy film patterns 2 being overlapped with each other, when viewing in the lamination direction Z. In other words, in the second light absorbing resin layer patterns 3, a pixel opening portion (opening portion) is formed for which a reference symbol is omitted.

For the second light absorbing resin layer pattern 3, it is preferable to remove only the terminal portion 61 in the region C which is a part of the terminal portion 61 as shown in FIG. 4, for example. The second light absorbing resin layer pattern 3 in the terminal portion 61 is removed together with the transparent resin layer 5 by dry etching. Further, a terminal cover can be laminated by laminating the transparent electrode pattern 6 (conductive film such as ITO).

The second light absorbing resin layer 3 is, for example, an insulator from an electrical viewpoint, in which a carbon pigment can be used as a light absorbing black material. An organic pigment and an optical density in the transmission measurement which may be added to the second light absorbing resin layer pattern 3 are similar to those of the light absorbing resin layer pattern 1.

A thermosetting resin can be used for the light absorbing resin layer pattern 1, and a black coating liquid can be used for the second light absorbing resin layer pattern 3, in which an alkali soluble photosensitive resin and the black material are dispersed. The refractive indexes of these resins are preferably low. The refractive indexes of the resins to be used, content of the black material such as a carbon pigment and a film thickness of the light absorbing resin layer pattern 1 are adjusted, whereby the reflectance of the light absorbing resin layer pattern 1 at the boundary surface can be 1% or less, when viewing from the transparent substrate 10. However, since the reflectance of the resins being used is limited, the lower limit of the reflectance is 0.2%. Assuming the solid content of the resin such as acrylic resin contained in the black coating liquid is 14 mass % for example, and setting an amount of a carbon pigment in the black coating liquid to be from 6 mass % to 25 mass %, the optical density of the light absorbance resin layer pattern 1 and 3 can be from 0.4 to 1.8 per 1 μm of a unit film thickness. When the film thickness of the light absorbing resin layer patterns 1 and 3 is 0.3 μm, the effective optical density is from 0.12 to 0.54. When the film thickness of the light absorbing resin layer patterns 1 and 3 is 0.7 μm, the effective optical density is from 0.28 to 1.26.

According to the thus constituted display unit 111, with the second light absorbing resin layer pattern 3, for example, light re-reflection or irregular reflection of light in the liquid crystal cell can be reduced. For example, light emitted from a backlight which is not shown and entered from the second transparent substrate 20 side, can be prevented from being re-reflected at the surface of the copper alloy film pattern 2, so that the light incident on an active element such as a TFT can be reduced.

A liquid crystal display device substrate 22A is constituted such that a plurality of light absorbing resin layer patterns 1, a plurality of copper alloy film patterns 2, a plurality of second light absorbing resin layer patterns 3, a transparent resin layer 5 and a plurality of transparent electrode patterns 6 are laminated on a surface of the first transparent substrate 10, facing the liquid crystal layer 24, in the order of the plurality of light absorbing resin layer patterns 1, the plurality of copper alloy film patterns 2, the plurality of second light absorbing resin layer patterns 3, the transparent resin layer 5 and the plurality of transparent electrode patterns 6.

(Manufacturing Method-2 for Liquid Crystal Display Device Substrate)

Hereinafter, a manufacturing method of the liquid crystal display device substrate 22A in the display unit 110 constituted as described above will be described. FIG. 12 is a flowchart showing a manufacturing method of the liquid crystal display device substrate 22A.

In the coating and formation of the light absorbing resin layer, the above-described black coating liquid is used and the film thickness is set to be 0.4 μm. In the coating and formation of the second light absorbing resin layer, considering a reduction of film thickness in the post processing, the film thickness is set to 0.7 μm.

Since the manufacturing processes after this process is the same as those of the manufacturing method-1 for liquid crystal display device substrate which is the manufacturing process describe for the liquid crystal display substrate 22, the explanation thereof is omitted.

According to the display unit 111 of the liquid crystal display device, the same effects as those of the display unit 110 of the first embodiment can be obtained.

(Third Embodiment)

Next, with reference to FIGS. 13 to 17, the third embodiment of the present invention will be described. For portions identical to those in the above-described embodiment, the same reference symbols are applied and the explanation thereof is omitted, and only different portions will be described.

Figure 13:
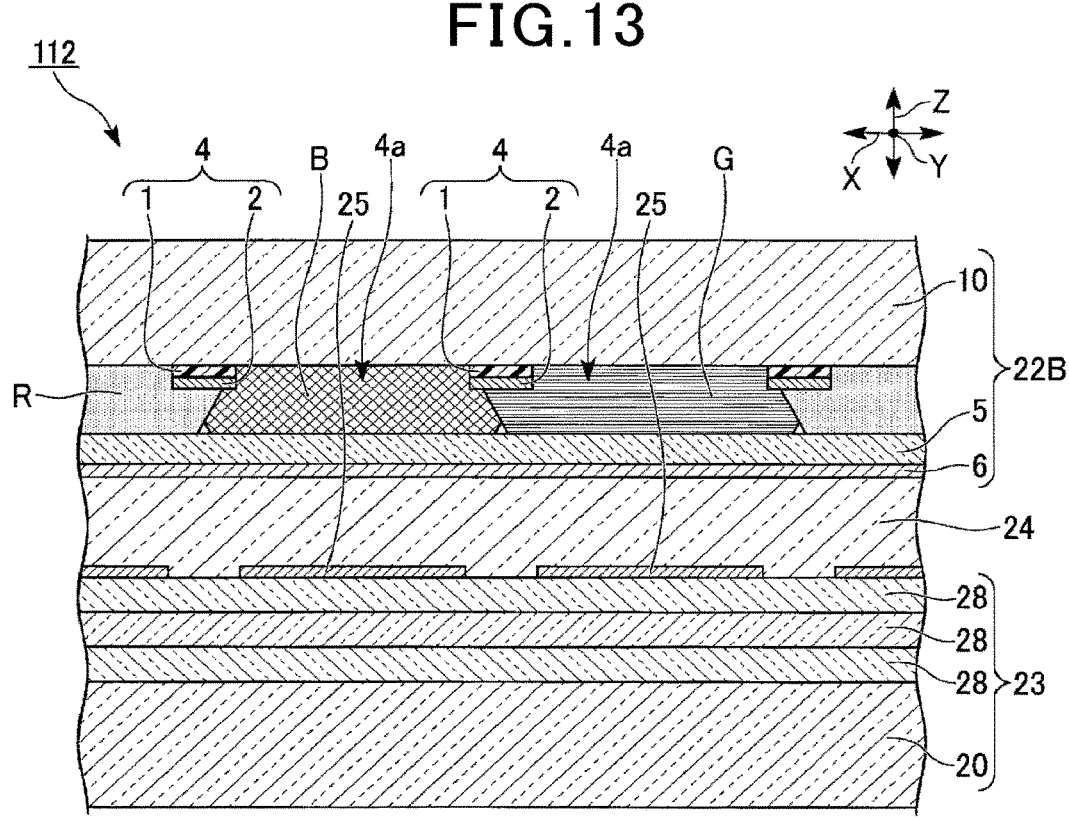
FIG. 13 is a cross sectional view showing a side surface in a display unit of the liquid crystal display device according to a third embodiment of the present invention.

As shown in FIG. 13, the display unit 112 according to the present embodiment is provided with a liquid crystal display device substrate 22B instead of the liquid crystal display device substrate 22 of the display unit 110 of the first embodiment. The liquid crystal display device substrate 22B includes one of a red pixel R formed by a red layer, a green pixel G formed by a green layer and a blue pixel B formed by a blue layer, in the respective pixel opening portions 4a of the black electrode 4 of the liquid crystal display device substrate 22. In plan view when viewing in the lamination direction Z, the red pixel R, the green pixel G and the blue pixel B are adjacently arranged between the copper alloy film pattern 2. In other words, the display unit 112 is provided with a white LED element including luminescent components of red, green and blue. Hence, red, green and blue color filters are combined so as to perform color display.

Figure 14:
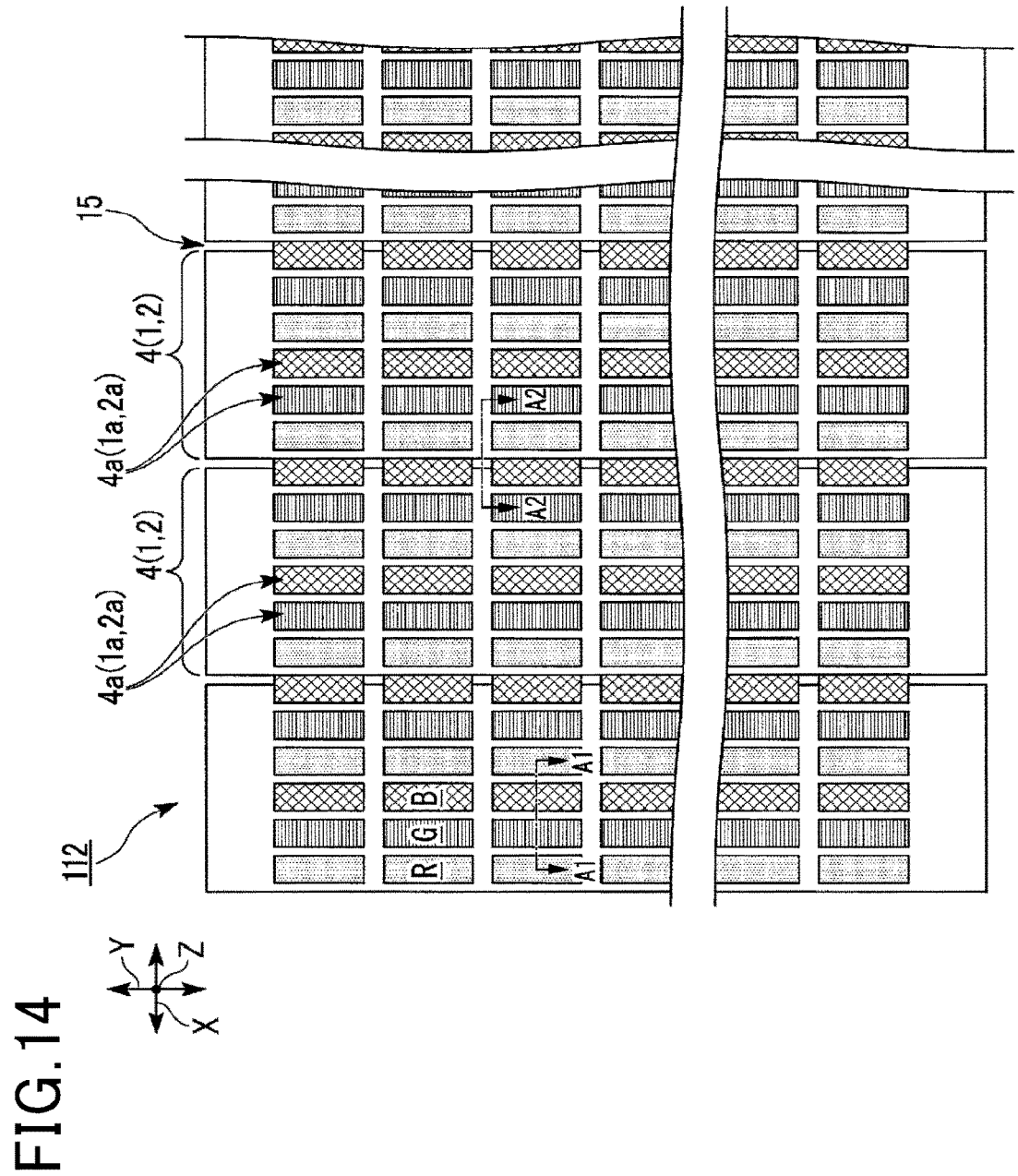
FIG. 14 is a plan view showing the display unit according to the third embodiment of the present invention.

FIG. 14 is a plan view showing the display unit 112 when viewing from the first transparent substrate 10. In the pixel opening portion 4a, one of the red pixel R, the green pixel G and the blue pixel B is disposed without gaps.

Figure 15:
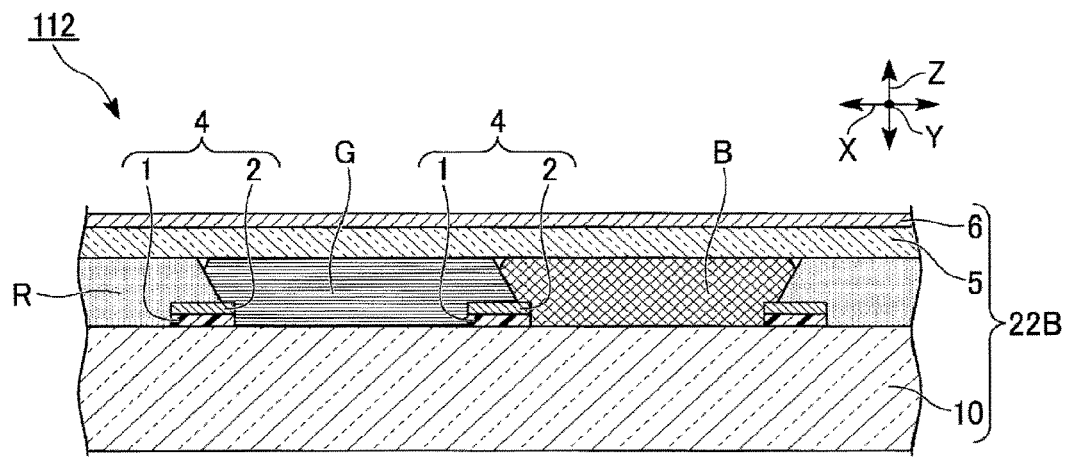
FIG. 15 is a cross sectional view showing taken along a line A1-A1 as shown in FIG. 14.

As shown in FIG. 15, on the first transparent substrate 10 and on the black electrode 4, the red pixel R, the green pixel G or the blue pixel B is disposed as a color filter without gaps. For the red pixel R, the green pixel G and the blue pixel B, a plurality of organic pigments are dispersed into a transparent substrate such as acrylic resin to form the red pixel R, the green pixel G and the blue pixel B, with a well-known photolithography method.

The transparent resin layer 5 is laminated on the color filter. The transparent electrode pattern 6 is further laminated on the transparent resin layer 5. The transparent electrode pattern 6 is formed with a transparent conductive film such as a conductive metal oxide referred to as, for example ITO, followed by patterning using a well-known photolithography method.

In the present embodiment, the transparent electrode pattern 6 is used as a detection electrode when detecting a change in the electrostatic capacitance during a touch sensing operation, and used as a common electrode in which a voltage driving the liquid crystal is applied between the pixel electrode 25 and the common electrode. The liquid crystal drive and detection in the electrostatic capacitance are performed alternately at different timings in a time sharing manner.

Alternatively, common electrode reverse driving may be performed in which the transparent electrode pattern 6 serves as a drive electrode (scanning electrode) and the polarity thereof is switched between positive and negative.

A source signal is applied to respective signal lines that drive the thin film transistors such that the polarity of the signal supplied to odd row signal lines and the polarity of signal supplied to even row signal lines are different from each other, while maintaining the electrical potential of the drive electrode to be zero and switching the polarity of the source signal between positive and negative. That is, a positive polarity signal and a negative polarity signal are alternately applied to the odd row signal line and the even row signal line, whereby a dot inversion drive for adjacent pixels can be performed.

Also, in the case where two thin film transistors are provided in a single pixel, dot inversion drive may be applied such that the polarity of the source signal is switched between positive and negative so as to have mutually different polarities between a signal applied to the first thin film transistor and a signal applied to the second thin film transistor.

Figure 16:
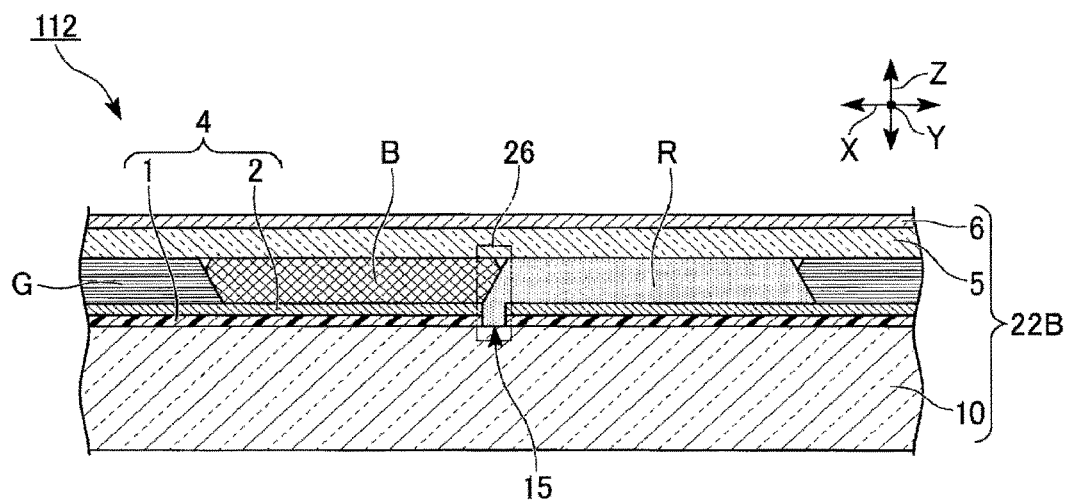
FIG. 16 is a cross sectional view showing taken along a line A2-A2 as shown in FIG. 14.

As shown in FIG. 16, the light absorbing resin layer pattern 1 and the copper alloy film pattern 2 each being a partial pattern of the black electrode 4 are electrically insulated by the gap portion 15. A color overlapped portion 26 of the color filter is provided on the gap portion 15 with two colors being overlapped, to suppress transmission of light emitted from the backlight unit. In the color overlapped portion 26, the red pixel R and the blue pixel B are preferably overlapped.

Although it is not illustrated, at the position of the gap portion 15, in plan view, one of the signal line (source line) 41, the scanning line (gate line) 42 and the auxiliary capacitance line 43 which is provided on the array substrate 23, or a metal wiring pattern, that is the same as the wiring pattern including these lines, is arranged covering the gap portion 15. Thus, light leaking from the backlight unit can be avoided.

Comparing to the above-described manufacturing method-1 of the liquid crystal display device substrate, the display unit 112 configured as described above can be manufactured by, forming the copper alloy film pattern 2, followed by performing a manufacturing process where the red pixel R, the green pixel G and the blue pixel B are inserted between the copper alloy film pattern 2 and the transparent resin layer 5 via the plurality of pixel opening portions 4a. In this case, in the flowchart as shown in FIG. 8, a process of forming color filters (R, G, B) is performed after the dry etching process of the light absorbing resin layer pattern 1 but before a coating and formation process of the transparent resin layer.

Figure 17:
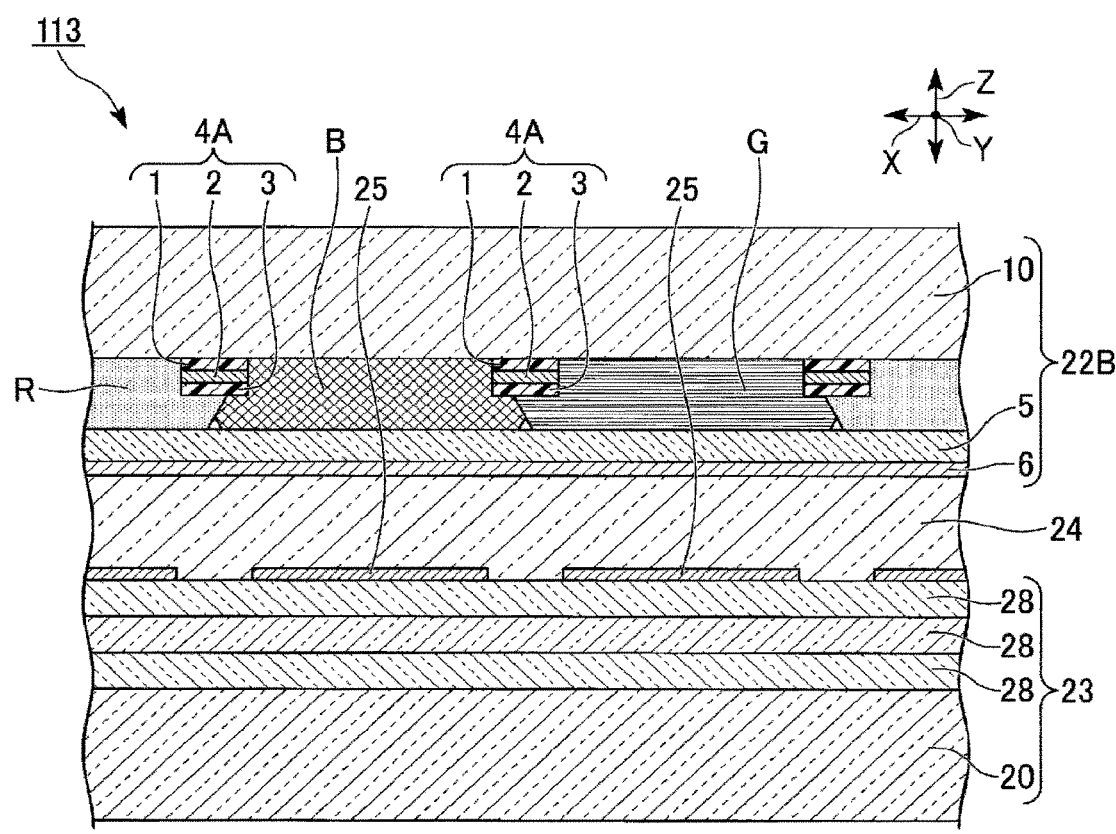
FIG. 17 is a cross sectional view showing a side surface of the display unit in a modification according to the third embodiment of the present invention.

The display unit 113 as shown in FIG. 17 is a modification of the display unit 112 according to the present embodiment.

The display unit 113 is provided with the black electrode 4A instead of the black electrode 4, constituted of three layers including the second light absorbing resin layer pattern 3. Since other configurations or effects thereof are already described, the explanation is omitted. When manufacturing the display unit configured as described above, the red pixel R, the green pixel G and the blue pixel B are inserted between the second light absorbing resin layer pattern 3 and the transparent resin layer 5.

(Fourth Embodiment)

Hereinafter, the fourth embodiment of the present invention will be described. For portions identical to those in the above-described embodiment, the same reference symbols are applied and the explanation thereof is omitted, and only different portions will be described.

According to the present embodiment, FIG. 2 is again referred since the configuration is the same as that of the first embodiment except for the copper alloy film pattern which is the black electrode 4. However, explanation for duplicated portions is omitted and portion of the copper alloy film pattern 2 which differs from the first embodiment will be described.

The copper alloy film pattern 2 shown in FIG. 2 is formed of, according to the present embodiment, a laminated copper alloy of which the total film thickness is 0.21 μm, where a copper-indium alloy film having a thickness of 0.015 μm is further laminated on a two layered copper alloy film including a first copper alloy film having a thickness of 0.015 μm containing oxygen and a second copper alloy film having a thickness of 0.18 μm containing substantially no oxygen.

It should be noted that containing substantially no oxygen means that oxygen gas is not introduced when forming the copper alloy film. Also, the copper alloy film's containing oxygen means that when forming this film, for example, oxygen gas having 10 at % is introduced into an argon based gas.

A copper alloy containing 0.5 at % magnesium and 0.5 at % aluminum (remaining content is copper) was used for the previously formed two layered copper alloy film (first copper alloy film and second copper alloy film).

A copper alloy film containing 22 at % indium and 78 at % copper was used for the copper-indium alloy film. These copper alloys contain a small amount of inevitable impurities. An amount of addition of indium into the copper alloy can be from 0.5% to 40 at %. Indium itself has a low melting point. There is a concern about heat resistance in a copper alloy containing indium exceeding 50 at %.

The copper-indium alloy film is provided on a surface of the copper alloy film pattern 2, facing the liquid crystal layer 24.

According to a copper alloy film that is an indium-rich copper-indium alloy film, e.g., 22 at % indium, indium oxide is formed due to a heat treatment process after film-formation or aging variation prior to a formation of a copper oxide, thereby minimizing formation of the copper oxide. The indium oxide can be a good conductive film so that electrical contact can be substantially maintained. In the case where a small amount of the copper oxide is formed, in a cover terminal portion, electrical connection to the transparent conductive film can readily be established, whereby reliability in the manufacturing process and mounting process can be improved.

Also, a reflection color in the surface of the copper-indium alloy film is close to white, so that red coloring due to copper alone can be avoided. Neutralization of the reflected color is not limited to using indium, however, it is possible to neutralize the reflected color by adjusting addition ratio of the above-exemplified alloy elements. The techniques concerning these copper alloys disclosed in the embodiments of the present invention can be adapted to the metal wiring 40 of the array substrate 23.

An indium-rich copper-indium alloy contains 10 to 40 at % indium. Making the alloy indium rich, the copper oxide is suppressed from being formed at a surface portion so that the above-described electrical connection can readily be made.

For example, according to a copper alloy film having a two layered configuration in which a surface layer is formed of a copper-titanium alloy and inside the copper alloy is made of dilute alloy (copper alloy containing alloy element of 3 at % or less), when the ratio of titanium exceeds 10 at % with respect to the copper, an etching rate during the wet etching is low. In this case, an etching failure occurs where a copper alloy film on a titanium-rich surface portion remains in an eaves shape. The copper-indium alloy is unlikely to cause such an etching failure even when the alloy element is distributed such that an amount of the copper alloy differs in the thickness direction of the copper alloy film. Since the copper-indium alloy containing indium with an added amount of 0.5 to 40 at % has heat resistant properties up to approximately 500° C., the copper-indium alloy sufficiently tolerates an annealing in a range from 350° C. to 500° C. applied to, for example, an array substrate provided with a thin film transistor having an IGZO channel layer. The metal wiring 40 of the array substrate 23 can be made of a copper-indium alloy.

According to the present embodiment, the transparent electrode pattern 6 is used as a detection electrode during a touch sensing operation, and used as a common electrode to which liquid crystal drive voltage is applied between the pixel electrode 25 and the common electrode when driving the liquid crystals. During the touch sensing operation, respective detection electrodes are applied with a common voltage potential. For example, the detection electrodes may be connected to a casing having conductivity to be the ground potential. The touch sensing and the liquid crystal drive are performed at different timings in a time sharing manner.

(Function Capable of being Served with Black Electrode)

The black electrode of the above-described embodiments can be used as, for example, a scanning electrode in the touch sensing operation. The driving condition (scanning frequency) of the liquid crystal when the transparent electrode is used for the scanning electrode, may preferably be used.

However, by using the black electrode as the scanning electrode, the scanning frequency for detecting electrostatic capacitance can be suitably adjusted depending on the desired responsivity. To obtain quick responsiveness, thinned-out black electrodes can be scanned. Alternatively, the black electrode can be a scanning electrode (drive electrode) to which voltage is applied at constant frequency (It should be noted that voltage applied to the scanning electrode (alternate current signal) may be based on an inversion drive method). Also, the voltage range of the alternate current signal being applied can be small so as to switch functions between the scanning electrode and the detection electrode.

Here, the black electrode can have a low resistance value, and the transparent electrode may include, for example, an auxiliary electrode to obtain a low resistance value thereof. Hence, a change in electrostatic capacitance produced in the touch sensing operation can be detected with high accuracy. In addition, as a touch electrode, the black electrode formed of a copper alloy film, which is a good conductor, can be arranged in a matrix with a thin line width.

The black electrode having a thin line width arranged on the transparent electrode produces a fringe effect, thereby increasing an electrostatic capacitance (fringe capacitance) in the vicinity of the pattern edge so that the electrostatic capacitance can be made larger. In other words, variation of the electrostatic capacitance depending on the presence/absence of a touch of a pointer such as a finger can be made large, whereby S/N ratio can be increased and the detection accuracy can be enhanced.

The black electrode serves as a low reflective black matrix when viewing from the display surface for example, so that a visibility can be improved. Further, the copper alloy film used for the configuration of the black electrode completely cuts off visible light so that light leaking from the backlight can be removed.

Furthermore, the black electrode according to the embodiments of the present invention, the copper alloy film or the second light absorbing resin layer is used as a matrix (mask) to process the light absorbing resin layer pattern by dry etching, thus providing a feature that the line width of the light absorbing resin layer pattern and the line width and shape of the copper metal film pattern are substantially the same.

Since the line width of the light absorbing resin layer pattern and the line width of the copper alloy film pattern are substantially the same, an aperture ratio of the pixel is not decreased.

The first to forth embodiments of the present invention have been described in detail so far, with reference to the drawings. The technical scope of the present invention should not be construed as being limited to the above-described embodiments. Various modifications can be applied to the present invention without departing from the spirit of the present invention, and further, above-described modifications can be combined as appropriate.

For example, according to the above-described first to the fourth embodiments, an oxide semiconductor is used for the channel layer 46 of the thin film transistor 45, however, the thin film transistor 45 may be a thin film transistor in which a silicon semiconductor is used for a channel layer.

A VA method is used for the liquid crystal drive method of the liquid crystal display device. However, it is not limited to this method. Other than this method, a liquid crystal drive method of the liquid crystal display device can be used being appropriately selected from, for example, HAN (Hybrid-aligned Nematic), TN (Twisted Nematic), OCB (Optically Compensated Bend), CPA (Continuous Pinwheel Alignment) and ECB (Electrically Controlled Birefringence).

The black electrode, i.e., the copper alloy film pattern 2 is used as a scanning electrode and the transparent electrode pattern 6 is used as a detection electrode. However, functions of the scanning electrode and the detection electrode can be switched such that the transparent electrode pattern 6 serves as the scanning electrode and the black electrode serves as the detection electrode.

According to PTL 1 to PTL 5, there have been the following problems.

According to PTL 1, as described in paragraphs [0018] to [0019], two pairs of electrode group are described in which spatial coordinate can be inputted by using electrostatic capacitive coupling with metals such as Al (aluminum) and Cr (chrome).

However, the technique of PTL 1 has many disadvantages. In paragraph [0019], it is described that two pairs of electrodes having light shielding properties serve as black matrix. In PTL 1, it is described that a conductor having light shielding properties is defined as metals such as Al, Cl or the like. However, these metals have high reflectance so that reflected light stands out in a bright room or outside when being exposed to sunlight, thereby causing degradation of display quality. Moreover, PTL 1 does not disclose a positional relationship, in a thickness direction of the display device, between black layer pattern using a black material and color filters which are used for various display devices, and the above-described two pairs of electrodes. Further, there is not sufficient description about the color display including permeation and reflection characteristics.

Furthermore, Al (aluminum) is not alkali tolerant. For example, it is difficult to conform to the photolithography processes which produce red pixels, green pixels and blue pixels. In more detail, in a regular color filter process where a colored pattern such as for red pixels is alkali-developed by using colored photo sensitive resin. However, since Al dissolves in alkali-developed liquid, it is difficult to apply Al to the color filter process. As for Cr, when a wet etching process is employed, there is a concern of environmental pollution by Cr ion and when a dry etching process is employed, there is a possible danger caused by halogen gas to be used.

PTL 2 describes, as recited in claim 1 of PTL 2, a display device including drive electrodes facing a plurality of pixel electrodes, a plurality of detection electrodes capacitive-coupled to the drive electrodes and a plurality of floating electrodes. As stated in paragraph [0023] of PTL 2, it is described that these drive electrodes are a double-use electrode which simultaneously performs a scanning drive of a touch sensor and a VCOM drive of an image display device. As for a multi-used electrode where the drive electrodes simultaneously perform the scanning drive and the VCOM drive, for example, in paragraph [0014] of PTL 1, a description of a function also having a signal writing capability in an electrode is present. Thus, the subject matter of PTL 2 is, as described in paragraph [0009] and [0019], to non-visualize the transparent electrode pattern by an arrangement of the floating electrodes.

Moreover, PTL 2 describes in paragraph [0056], the counter electrode and the detection electrode formed of ITO (Indium Tin Oxide), IZO (a registered trade mark), an organic conductive film or the like. However, PTL 2 does not describe a technique of forming either of the electrodes with a two-layered configuration including, e.g., a light shielding layer and a copper alloy film. In PTL 2, a channel material of the TFT (Thin Film Transistor) and a material of the wiring are not disclosed.

In PTL 3, according to the description recited in claim 1 or described in paragraphs [0009] to [0012] of PTL 3, a technique is described in which a slit is applied to a first electrode capable of serving as a common electrode. As shown in FIG. 1 (a), (b) and FIG. 4 (a), (b) or FIG. 5 (a), (b), (c), this slit is formed between pixels, as an opening portion of a first electrode. Effects of the slit can be determined such that non-uniformity between pixels can be improved according to descriptions of paragraphs [0013] and [0008].

PTL 3 does not disclose a technique of forming one of the above-described electrodes to have a two-layered configuration including, e.g., a light shielding layer and a copper alloy film. In PTL 3, the channel material of the TFT and the material of wiring are not disclosed. PTL 3 does not disclose a configuration in which the first electrode and the second electrode are laminated on a surface touching a liquid crystal of the counter electrode in a thickness direction, for example, via an insulation layer such as a transparent resin layer. In paragraph [0079] of PTL 3, IPS (In Plane Switching) liquid crystal mode or the FFS (Fringe Field Switching) method is described. However, the possibility of application of a VA method (longitudinal electric field method using liquid crystal molecules having vertical alignment) is not disclosed.

In PTL 4, as recited in claim 1 of PTL 4, an electrostatic capacitive type touch panel substrate is described in which a first unit electrode and a second unit electrode are disposed adjacently on an identical plane. For example, a configuration is shown in FIG. 3 (a) and (b) in which a conductive layer 7 is laminated on an insulation light shielding layer 6. Further, the configuration includes both of a portion where the insulation light shielding layer 6 is not formed as shown in FIG. 1 which is a cross sectional view taken along line A-A' of FIG. 3 (a), and a portion where the conductive layer 7 is formed on the insulation light shielding layer.

As shown in FIG. 2, since the insulation light shielding layer has a large width, there is a concern that an aperture ratio of an opening portion is decreased. Conversely, in FIG. 1, since the conductive layer 7 can be visually recognized through the transparent insulation substrate, there is a concern that reflective light from the conductive layer 7 enters the eyes of the observer, causing significant degradation of visibility. As described in paragraph [0071] of PTL 4, the conductive layer 7 electrically connects to a position detection electrode 9 which allows visible light to be transmitted via a contact hole, however the conductive layer 7 does not perform a detection using electrostatic capacitance.

PTL 4 does not disclose a configuration where a sense electrode as a position detection electrode 9 and a drive electrode are laminated, via an insulation layer for example, being orthogonally crossed with each other, on a surface of the transparent insulation substrate contacting liquid crystal molecules. In addition, PTL 4 fails to disclose a technique in which the insulation light shielding layer 6 and a conductive layer 7 are designed to have identical shape and dimensions when seen in plan view.

The technique described in PTL 4 has a problem of extremely complexed configuration including a formation of a contact hole. Also, in view of an aperture ratio, it cannot be said that PTL 4 suggests a touch panel substrate having better visibility.

PTL 5 describes a display device having an oxide layer containing an element selected from In, Ga and Zn, as a semiconductor layer of an active element. The display device is provided with one frame period including a first period for writing image data and a second period for sensing a detection of a position of an object to be detected. The position detection unit includes a plurality of first electrodes and a plurality of second electrodes which cross each other. In plan views as shown in FIG. 4 or FIG. 24, the plurality of first electrodes and the plurality of second electrodes are adjacent to each other and coupled with capacity at the adjacent portion, as recited in claim 3.

In FIG. 2, a pixel arrangement of a TFT substrate according to a technique of PTL 5 is shown, which is arranged in a horizontal direction and a vertical direction when viewing in plan view. In FIG. 4 and FIG. 24, show a first electrode and a second electrode having a diamond shape, divided by a slit in a direction at approximately 45 degrees.

According to the technique of PTL 5, the shape of pixel electrodes and the state of how the first electrode and the second electrode having a diamond shape are positionally aligned are unknown, and an optimized liquid crystal has not been disclosed in which the first electrode and the second electrode which are divided by the slit in a direction at 45 degrees are used as a common electrode Corn. Assuming a liquid crystal with vertical alignment, it is considered that a 45 degree slit unfavorably influences liquid crystal alignment or its transmittance. As described in paragraph [0143], [0144] and as shown in FIG. 13, a conductive layer 27 and a bridge electrode 7 are formed of the same metal layer. However, no technique is disclosed in which either the first electrode or the second electrode is configured of two layers including a metal layer and a black matrix.

For example, a black electrode is not disclosed in which a light absorbing resin layer pattern and a copper alloy film pattern are laminated in the same shape and with the same dimensions.

Considering the above-mentioned circumstances, for example, the following performance is desired for a display device. Specifically, in the electrostatic capacitive type, low resistance value is desired for the wiring of the above-described pair of electrode group in order to reduce noise during a touch sensing operation by a pointer such as a finger or a pen. In particular, multiple electrode groups are desired to be located closer to the pointer such as a finger, and the resistance value of a scanning electrode (drive electrode) related to the touch sensing is desired to be low. Also, the resistance value of the detection electrode which orthogonally crosses the scanning electrode is preferably low. Hereinafter, electrodes related to touch sensing, i.e., the detection electrode and the scanning electrode are referred to as touch electrodes.

Moreover, the multiple electrode groups adapted for the display device are desired to have low reflectance or high transmittance. The desirability of the low reflectance is because when bright external light such as sunlight is incident on the display surface and the light reflectance of the plurality of electrode group is high, the display quality will be significantly decreased. For example, in the case where a pair of electrode group is formed with a single layer formed of aluminum or chrome, or two layers formed of these metal and chromium hydroxide, the reflectance to the external light is large, causing degradation of the visibility of display.

The present invention has been achieved in light of the above-mentioned problems and can provide a liquid crystal display device in which a touch sensing function is integrated, and an aperture ratio is improved, having a black copper alloy film pattern in its exterior and good visibility. Further, the present invention can provide a liquid crystal display device having high performance in detecting a position of a pointer such as a finger with a simple configuration.

A liquid crystal display device according to a first aspect of the present invention includes a display unit having a display substrate and an array substrate laminated via a liquid crystal layer, and a control unit that controls the display unit. The display substrate is composed of a plurality of light absorbing resin layer patterns in which an opening portion is formed, a plurality of copper alloy film patterns, a transparent resin layer and a plurality of transparent electrode patterns which are laminated in this order on a surface of a first transparent substrate, facing the liquid crystal layer. The array substrate includes, on a surface of a second transparent substrate, facing the liquid crystal layer, a metal wiring, a plurality of pixel electrodes, a plurality of thin film transistors and an insulation layer. The plurality of light absorbing resin layer patterns and the plurality of copper alloy film patterns are formed in an identical pattern being overlapped with each other, when viewing from a lamination direction in which the display substrate, the liquid crystal layer and the array substrate are laminated. The plurality of copper alloy film patterns are arranged in a first direction which orthogonally crosses the lamination direction to be insulated from each other. The plurality of transparent electrode patterns are arranged in a second direction which orthogonally crosses both the lamination direction and the first direction to be insulated from each other. The plurality of light absorbing resin layer patterns are formed of a light absorbing resin layer containing a black material. The control unit performs, in a time sharing manner, a liquid crystal driving in which liquid crystal (liquid crystal molecules) included in the liquid crystal layer are driven by applying a voltage between the transparent electrode pattern and the pixel electrode in the lamination direction, and detection of a change in an electrostatic capacitance between the plurality of copper alloy film patterns and the plurality of transparent electrode patterns.

In the liquid crystal display device according to the first aspect of the present invention, a plurality of second light absorbing resin layer patterns may be arranged between the plurality of copper alloy film patterns and the transparent resin layer. In this case, the plurality of light absorbing resin layer patterns correspond to "a plurality of first light absorbing resin layer patterns" which is described as follows. Moreover, in this case, the plurality of first light absorbing resin layer patterns and the plurality of second light absorbing resin layer patterns are formed of a light absorbing resin layer containing a black material.

A liquid crystal display device according to a second aspect of the present invention includes a display unit having a display substrate and an array substrate laminated via a liquid crystal layer, and a control unit that controls the display unit. The display substrate is composed of a plurality of first light absorbing resin layer patterns in which an opening portion is formed, a plurality of copper alloy film patterns, a plurality of second light absorbing resin layer patters, a transparent resin layer and a plurality of transparent electrode patterns which are laminated in this order on a surface of a first transparent substrate, facing the liquid crystal layer. The array substrate includes, on a surface of a second transparent substrate, facing the liquid crystal layer, a metal wiring, a plurality of pixel electrodes, a plurality of thin film transistors and an insulation layer. The plurality of first light absorbing resin layer patterns and the plurality of copper alloy film patterns are formed in an identical pattern being overlapped with each other, when viewing from a lamination direction in which the display substrate, the liquid crystal layer and the array substrate are laminated. The plurality of copper alloy film patterns are arranged in a first direction which orthogonally crosses the lamination direction to be insulated from each other. The plurality of transparent electrode patterns are arranged in a second direction which orthogonally crosses both the lamination direction and the first direction to be insulated from each other. The plurality of first light absorbing resin layer patterns and the plurality of second light absorbing resin layer patterns are formed of a light absorbing resin layer containing a black material. The control unit performs, in a time sharing manner, liquid crystal driving in which liquid crystal (liquid crystal molecules) included in the liquid crystal layer are driven by applying a voltage between the transparent electrode pattern and the pixel electrode in the lamination direction, and detection of a change in an electrostatic capacitance between the plurality of copper alloy film patterns and the plurality of transparent electrode patterns.

Also, the plurality of first light absorbing resin layer patterns, the plurality of second light absorbing resin layer patterns and the plurality of copper alloy film patterns may be formed in the same shape being overlapped with each other, when viewing in the lamination direction in which the display substrate, the liquid crystal layer and the array substrate are laminated. Hereinafter, a laminate configuration of the light absorbing resin layer pattern and the copper alloy film patterns, or a laminate configuration of the first light absorbing resin layer pattern, the copper alloy film pattern and the second light absorbing resin layer pattern are referred to as the black electrode.

According to the liquid crystal display device of the first aspect and the second aspect of the present invention, the black material is preferably made of a carbon pigment.

According to the liquid crystal display device of the first aspect and the second aspect of the present invention, the plurality of thin film transistors are preferably provided with a channel layer containing two or more types of metal oxides selected from gallium, indium, zinc, tin and germanium.

According to the liquid crystal display device of the first aspect and the second aspect of the present invention, the metal wiring preferably includes a plurality of auxiliary capacitance lines.

According to the liquid crystal display device of the first aspect and the second aspect of the present invention, the metal wiring is preferably formed of a plurality of layers and at least one layer in the plurality of layers is preferably a copper alloy layer.

According to the liquid crystal display device of the first aspect and the second aspect of the present invention, an alloy element contained in the plurality of copper alloy film patterns is preferably one or more elements selected from magnesium, calcium, titanium, molybdenum, indium, tin, zinc, aluminum, beryllium and nickel.

According to the liquid crystal display device of the first aspect and the second aspect of the present invention, a copper-indium alloy film is preferably provided on a surface of the copper alloy film pattern, facing the liquid crystal layer.

According to the liquid crystal display device of the first aspect and the second aspect of the present invention, an auxiliary conductor is preferably provided on the plurality of transparent electrode patterns, the auxiliary conductor having a resistivity lower than that of the transparent electrode pattern.

According to the liquid crystal display device of the first aspect and the second aspect of the present invention, the auxiliary conductor is preferably provided at a position overlapping the metal wiring when viewing in the lamination direction.

According to the liquid crystal display device of the first aspect and the second aspect of the present invention, an initial alignment of the liquid crystal molecules is preferably a vertical alignment.

According to the liquid crystal display device of the first aspect of the present invention, the opening portion preferably includes one of a red pixel formed of a red layer, a green pixel formed of a green layer, and a blue pixel formed of a blue layer; and the red pixel, the green pixel and the blue pixel are preferably inserted between the plurality of copper alloy film patterns and the transparent resin layer in the lamination direction, and are arranged being adjacent to each other, when viewing in the lamination direction.

According to the liquid crystal display device of the second aspect of the present invention, the opening portion preferably includes one of a red pixel formed of a red layer, a green pixel formed of a green layer, and a blue pixel formed of a blue layer; the red pixel, the green pixel and the blue pixel are preferably inserted between the plurality of second light absorbing resin layer patterns and the transparent resin layer in the lamination direction, and are arranged being adjacent to each other, when viewing in the lamination direction.

In the present invention according to the first and second aspects, by increasing the aperture ratio, for example, a liquid crystal display device having an improved transmittance can be provided. Also, a liquid crystal display device can be provided, in which accurate positional detection of a pointer such as a finger is performed, and a black electrode having low resistance and low reflectance is provided. In the present invention according to the second aspect, since the second light absorbing resin layer is formed on the copper alloy film pattern, re-reflection of light in the liquid crystal cell can be avoided. For example, in the case where the plurality of metal wirings (including source wiring and gate wiring) in the second transparent substrate of the array substrate is made of copper or aluminum, re-reflection or irregular reflection of light between the copper alloy film patterns arranged in the first substrate can be avoided. When the thin film transistor has a sensitivity to light, light obliquely entering to this thin film transistor can be mitigated.

REFERENCE SIGNS LIST

1: light absorbing resin layer pattern (first light absorbing resin layer pattern)
1a: pixel opening (opening portion)
2: copper alloy film pattern
3: second light absorbing resin layer pattern
5: transparent resin layer
6: transparent electrode pattern
10: first transparent substrate
16: auxiliary conductor
20: second transparent substrate
22, 22A, 22B: liquid crystal display device substrate (display substrate)
23: array substrate
24: liquid crystal layer
25: pixel electrode
28: insulation layer
40: metal wiring
43: auxiliary capacitance line
45: thin film transistor
46: channel layer
100: liquid crystal display device
110, 111, 112, 113: display unit
120: control unit
B: blue pixel
G: green pixel
R: red pixel
X: first direction
Y: second direction
Z: lamination direction Obviously, numerous modifications and variations of the present invention are possible in light of the above teachings. It is therefore to be understood that within the scope of the appended claims, the invention may be practiced otherwise than as specifically described herein.

What is claimed is:
1. A liquid crystal display device, comprising:
a display substrate;
an array substrate; and
a liquid crystal layer formed between the display substrate and the array substrate,
wherein the display substrate includes
a first transparent substrate,
at least one light absorbing resin layer which is formed on the first transparent substrate and comprises a black material,
a touch electrode layer formed on the light absorbing resin layer and comprising a copper alloy film comprising at least one element selected from the group consisting of magnesium, calcium, indium, tin, zinc, beryllium and nickel,
a transparent resin layer formed on the touch electrode layer,
a transparent electrode layer formed between the transparent resin layer and the liquid crystal layer, and
an auxiliary conductor,
the light absorbing resin layer is patterned such that a plurality of resin portions and an opening portion are formed,
the touch electrode layer is patterned such that a plurality of touch electrode portions of the touch electrode layer are insulated from one another and each extended in a first direction perpendicular to a lamination direction,
the touch electrode layer and the light absorbing resin layer have a same pattern such that the touch electrode portions and the resin portions completely overlap with one another when viewed in the lamination direction,
the transparent electrode layer is patterned such that a plurality of transparent electrode portions of the transparent electrode layer are insulated from one another and each extended in a second direction perpendicular to the lamination direction and the first direction,
the auxiliary conductor is positioned on one of the transparent electrode portions and having a resistivity lower than a resistivity of the one of the transparent electrode portions,
the array substrate includes
a second transparent substrate,
a metal wiring formed on the second transparent substrate,
at least one insulation layer formed on the second transparent substrate, and
a plurality of pixel electrodes connected to a plurality of thin film transistors and formed on the insulation layer, and
the thin film transistors each include a channel layer comprising at least one oxide of at least one metal selected from the group consisting of gallium, indium, zinc, tin and germanium.

2. The liquid crystal display device according to claim 1, wherein the black material comprises a carbon pigment.

3. The liquid crystal display device according to claim 1, wherein the channel layer comprises an oxide of gallium, indium, and zinc.

4. The liquid crystal display device according to claim 1, wherein the metal wiring includes a plurality of auxiliary capacitance lines.

5. The liquid crystal display device according to claim 1, wherein the metal wiring comprises a plurality of layers including at least one copper alloy layer.

6. The liquid crystal display device according to claim 1, wherein the copper alloy film comprises indium.

7. The liquid crystal display device according to claim 1, further comprising:
a copper-indium alloy film formed on the copper alloy film on a side where the liquid crystal layer is formed.

8. The liquid crystal display device according to claim 1, wherein the auxiliary conductor is positioned such that the auxiliary conductor overlaps with the metal wiring when viewed in a lamination direction.

9. The liquid crystal display device according to claim 1, wherein the liquid crystal layer includes a liquid crystal molecule having a vertical alignment as an initial alignment.

10. The liquid crystal display device according to claim 1, wherein one of a red pixel comprising a red layer, a green pixel comprising a green layer, and a blue pixel comprising a blue layer is formed in the opening portion, and
the red pixel, the green pixel and the blue pixel are formed between the touch electrode layer and the transparent resin layer in the lamination direction, and positioned adjacent to one another when viewed in the lamination direction.

11. The liquid crystal display device according to claim 1, wherein the copper alloy film comprises a first copper alloy film and a second copper alloy film having different thicknesses.

12. The liquid crystal display device according to claim 11, wherein the first copper alloy film contains oxygen, and the second copper alloy film contains substantially no oxygen.

13. The liquid crystal display device according to claim 12, further comprising:
a copper-indium alloy film formed on the copper alloy film.

14. The liquid crystal display device according to claim 13, wherein the first copper alloy film and the second copper alloy film each comprise aluminum and magnesium.

15. A liquid crystal display device, comprising:
a display substrate;
an array substrate; and
a liquid crystal layer formed between the display substrate and the array substrate,
wherein the display substrate includes
a first transparent substrate,
a first light absorbing resin layer which is formed on the first transparent substrate and comprises a black material,
a touch electrode layer formed on the light absorbing resin layer and comprising a copper alloy film comprising at least one element selected from the group consisting of magnesium, calcium, indium, tin, zinc, beryllium and nickel,
a second light absorbing resin layer which is formed on the touch electrode layer and comprises a black material,
a transparent resin layer formed on the touch electrode layer,
a transparent electrode layer formed between the transparent resin layer and the liquid crystal layer, and
an auxiliary conductor,
the first light absorbing resin layer is patterned such that a plurality of resin portions and an opening portion are formed,
the touch electrode layer is patterned such that a plurality of touch electrode portions of the touch electrode layer are insulated from one another and each extended in a first direction perpendicular to the lamination direction,
the touch electrode layer and the first light absorbing resin layer have a same pattern such that the touch electrode portions and the resin portions completely overlap with one another when viewed in a lamination direction,
the auxiliary conductor is positioned on one of the transparent electrode portions and having a resistivity lower than a resistivity of the one of the transparent electrode portions,
the array substrate includes
a second transparent substrate,
a metal wiring formed on the second transparent substrate,
at least one insulation layer formed on the second transparent substrate, and
a plurality of pixel electrodes connected to a plurality of thin film transistors and formed on the insulation layer, and
the thin film transistors each include a channel layer comprising at least one oxide of at least one metal selected from the group consisting of gallium, indium, zinc, tin and germanium.

16. The liquid crystal display device according to claim 15, wherein the black material of each of the first and second light absorbing resin layers comprises a carbon pigment.

17. The liquid crystal display device according to claim 15, further comprising:
a copper-indium alloy film formed on the copper alloy film on a side where the liquid crystal layer is formed.

18. The liquid crystal display device according to claim 15, wherein one of a red pixel comprising a red layer, a green pixel comprising a green layer, and a blue pixel comprising a blue layer is formed in the opening portion, and
the red pixel, the green pixel and the blue pixel are formed between the second light absorbing resin layer and the transparent resin layer in the lamination direction, and positioned adjacent to one another when viewed in the lamination direction.

* * * * *